United States Patent
Tsai

(10) Patent No.: US 12,232,204 B2
(45) Date of Patent: Feb. 18, 2025

(54) METHOD OF SMALL DATA TRANSMISSION AND RELATED DEVICE

(71) Applicant: SHARP KABUSHIKI KAISHA, Sakai (JP)

(72) Inventor: Hsin-Hsi Tsai, Taipei (TW)

(73) Assignee: SHARP KABUSHIKI KAISHA, Sakai (JP)

(*) Notice: Subject to any disclaimer, the term of this patent is extended or adjusted under 35 U.S.C. 154(b) by 349 days.

(21) Appl. No.: 17/738,492

(22) Filed: May 6, 2022

(65) Prior Publication Data

US 2022/0361278 A1    Nov. 10, 2022

Related U.S. Application Data

(60) Provisional application No. 63/185,935, filed on May 7, 2021.

(51) Int. Cl.
| | |
|---|---|
| *H04W 76/27* | (2018.01) |
| *H04W 72/21* | (2023.01) |
| *H04W 74/0833* | (2024.01) |

(52) U.S. Cl.
CPC ........... *H04W 76/27* (2018.02); *H04W 72/21* (2023.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2023/0276520 A1* | 8/2023 | Xu | ......................... | H04W 76/27 370/329 |
| 2023/0284289 A1* | 9/2023 | Watts | ..................... | H04W 48/20 370/329 |
| 2023/0413207 A1* | 12/2023 | Yue | ................... | H04W 56/0045 |

OTHER PUBLICATIONS

Panasonic: "T319-like timer for the SDT procedure", 3GPP Draft; R2-2100817, 3rd Generation Partnership Project (3GPP), Mobile Competence Centre ; 650, Route Des Lucioles ; F-06921 Sophia-Antipolis Cedex ; France vol. RAN WG2, No. Online; Jan. 25, 2021-Feb. 5, 2021 Jan. 14, 2021 (Jan. 14, 2021), Figure 1, Chapters 2.2 and 2.3.
Zte et al: "The issues on user plane common aspects for SDT", 3GPP Draft; R2-2103018, 3rd Generation Partnership Project (3GPP), Mobile Competence Centre ; 650, Route Des Lucioles ; F-06921 Sophia-Antipolis Cedex ; France vol. RAN WG2, No. eMeeting; Apr. 12, 2021-Apr. 20, 2021 Apr. 1, 2021 (Apr. 1, 2021), Chapter 2 on pp. 1-3.
InterDigital, "Small data transmission failure and cell reselection", 3GPP RAN WG2 Meeting #112e eMeeting Nov. 2-13, 2020, R2-2010109.

(Continued)

*Primary Examiner* — Anh Ngoc M Nguyen
(74) *Attorney, Agent, or Firm* — ScienBiziP, P.C.

(57) ABSTRACT

A method for a user equipment (UE) to perform small data transmission (SDT) is provided. The method includes receiving, from a base station (BS), system information that includes an SDT configuration, the SDT configuration including an SDT-specific timer; initiating an SDT procedure when the UE is in a radio resource control (RRC) inactive (RRC_INACTIVE) state; triggering a Buffer Status Report (BSR) during the SDT procedure; and starting or restarting the SDT-specific timer in response to triggering the BSR.

18 Claims, 7 Drawing Sheets

(56) References Cited

OTHER PUBLICATIONS

3GPP TS 38.214, "3rd Generation Partnership Project; Technical Specification Group Radio Access Network; NR; Physical layer procedures for data (Release 16)", V16.5.0 (Mar. 2021).
3GPP TS 38.321, "3rd Generation Partnership Project; Technical Specification Group Radio Access Network; NR; Medium Access Control (MAC) protocol specification (Release 16)", V16.4.0 (Mar. 2021).
3GPP TS 38.300, "3rd Generation Partnership Project; Technical Specification Group Radio Access Network; NR; NR and NG-RAN Overall Description; Stage 2 (Release 16)", V16.5.0 (Mar. 2021).
3GPP TS 37.324, "3rd Generation Partnership Project; Technical Specification Group Radio Access Network; E-UTRA and NR; Service Data Adaptation Protocol (SDAP) specification (Release 16)", V16.0.0 (Mar. 2020).
3GPP TS 38.306, "3rd Generation Partnership Project; Technical Specification Group Radio Access Network; NR; User Equipment (UE) radio access capabilities (Release 16)", V16.0.0 (Mar. 2020).
3GPP TS 38.212, "3rd Generation Partnership Project; Technical Specification Group Radio Access Network; NR; Multiplexing and channel coding (Release 16)", V16.5.0 (Mar. 2021).
3GPP TS 38.213, "3rd Generation Partnership Project; Technical Specification Group Radio Access Network; NR; Physical layer procedures for control (Release 16)", V16.5.0 (Mar. 2021).
3GPP TS 38.331, "3rd Generation Partnership Project; Technical Specification Group Radio Access Network; NR; Radio Resource Control (RRC) protocol specification (Release 16)", V16.4.1 (Mar. 2021).

* cited by examiner

METHOD OF SMALL DATA TRANSMISSION AND RELATED DEVICE

CROSS-REFERENCE TO RELATED APPLICATION(S)

The present disclosure claims the benefit of and priority to U.S. Provisional Patent Application Ser. No. 63/185,935, filed on May 7, 2021, entitled "PROCEDURES FOR SMALL DATA TRANSMISSION," the content of which is hereby incorporated herein fully by reference into the present disclosure.

FIELD

The present disclosure is generally related to wireless communications and, more specifically, to a method of small data transmission and a related device configured to employ the method.

BACKGROUND

With the tremendous growth in the number of connected devices and the rapid increase in user/network traffic volume, various efforts have been made to improve different aspects of wireless communication for next-generation wireless communication systems, such as the fifth-generation (5G) New Radio (NR) system, by improving data rate, latency, reliability, and mobility.

The 5G NR system is designed to provide flexibility and configurability for optimizing network services and types, and accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication in next-generation wireless communication systems.

Abbreviations used in this disclosure include:

| Abbreviation | Full name |
|---|---|
| 3GPP | 3rd Generation Partnership Project |
| 5G | 5th generation |
| ACK | Acknowledgement |
| AS | Access Stratum |
| BS | Base Station |
| BSR | Buffer Status Report |
| BWP | Bandwidth Part |
| CA | Carrier Aggregation |
| CBRA | Contention Based Random Access |
| CCCH | Common Control CHannel |
| CE | Control Element |
| CFRA | Contention Free Random Access |
| CG | Configured Grant |
| CN | Core Network |
| CORESET | Control Resource Set |
| CP | Control Plane |
| C-RNTI | Cell-Radio Network Temporary Identifier |
| CSI | Channel State Information |
| CS-RNTI | Configured Scheduling RNTI |
| CSS | Common Search Space |
| DC | Dual Connectivity |
| DCI | Downlink Control Information |
| DFI | Downlink Feedback Information |
| DG | Dynamic Grant |
| DL | Downlink |
| DRX | Discontinuous Reception |
| DRB | Data Radio Bearer |
| eNB | Evolved Node B |
| E-UTRA | Evolved Universal Terrestrial Radio Access |
| E-UTRAN | Evolved Universal Terrestrial Radio Access Network |
| FR | Frequency Range |
| gNB | Next-Generation Node B |
| HARQ | Hybrid Automatic Repeat Request |
| IE | Information Element |
| LCP | Logical Channel Prioritization |
| LCG | Logical Channel Group |
| LCH | Logical Channel |
| LTE | Long Term Evolution |
| MAC | Medium Access Control |
| MCG | Master Cell Group |
| MPE | Maximum Permissible Exposure |
| MSG | Message |
| NACK | Non-Acknowl edgement |
| NAS | Non-Access Stratum |
| NG-RAN | Next-Generation Radio Access Network |
| NUL | Normal Uplink |
| NW | Network |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PSCell | Primary SCell |
| PUCCH | Physical Uplink Control Channel |
| PUSCH | Physical Uplink Shared Channel |
| PRACH | Physical Random Access Channel |
| RA | Random Access |
| RACH | Random Access Channel |
| RAR | Random Access Response |
| RB | Radio Bearer |
| Rel | Release |
| RLC | Radio Link Control |
| RNA | RAN notification area |
| RNTI | Radio Network Temporary Identifier |
| RRC | Radio Resource Control |
| RO | RACH Occasion |
| RS | Reference Signal |
| RSRP | Reference Signal Received Power |
| Rx | Reception |
| SCell | Secondary Cell |
| SCG | Secondary Cell Group |
| SCS | Subcarrier Spacing |
| SDAP | Service Data Adaptation Protocol |
| SDT | Small Data Transmission |
| SDU | Service Data Unit |
| SI | System Information |
| SIB | System Information Block |
| SLIV | Start and Length Indicator Value |
| SR | Scheduling Request |
| SRB | Signaling Radio Bearer |
| SRS | Sounding Reference Signal |
| SS | Search Space |
| SSB | SS/PBCH Block |
| SS-RSRP | Synchronization Signal-RSRP |
| SpCell | Special Cell |
| SUL | Supplementary Uplink |
| TA | Timing Advance |
| TAT | Timing Alignment Timer |
| TAU | Tracking Area Update |
| TS | Technical Specification |
| Tx | Transmission |
| TBS | Transport Block Size |
| TRP | Transmission/Reception Point |
| UE | User Equipment |
| UL | Uplink |
| UL-SCH | Uplink Shared Channel |
| UP | User Plane |

SUMMARY

The present disclosure provides a method of small data transmission (SDT) and a related device.

According to an aspect of the present disclosure, a method for a user equipment (UE) to perform small data transmission (SDT) is provided. The method includes receiving, from a base station (BS), system information that includes a SDT configuration, the SDT configuration including an SDT-specific timer; initiating an SDT procedure when the UE is in a radio resource control (RRC) inactive (RRC_INACTIVE) state; triggering a Buffer Status Report (BSR) during the SDT procedure; and starting or restarting the SDT specific timer in response to triggering the BSR.

According to another aspect of the present disclosure, a UE for performing a small data transmission (SDT) is provided. The UE includes at least one processor processor, and at least one memory memory coupled to the at least one processor and storing computer-executable instructions that, when executed by the at least one processor, cause the UE to perform the above-disclosed method of performing the SDT.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
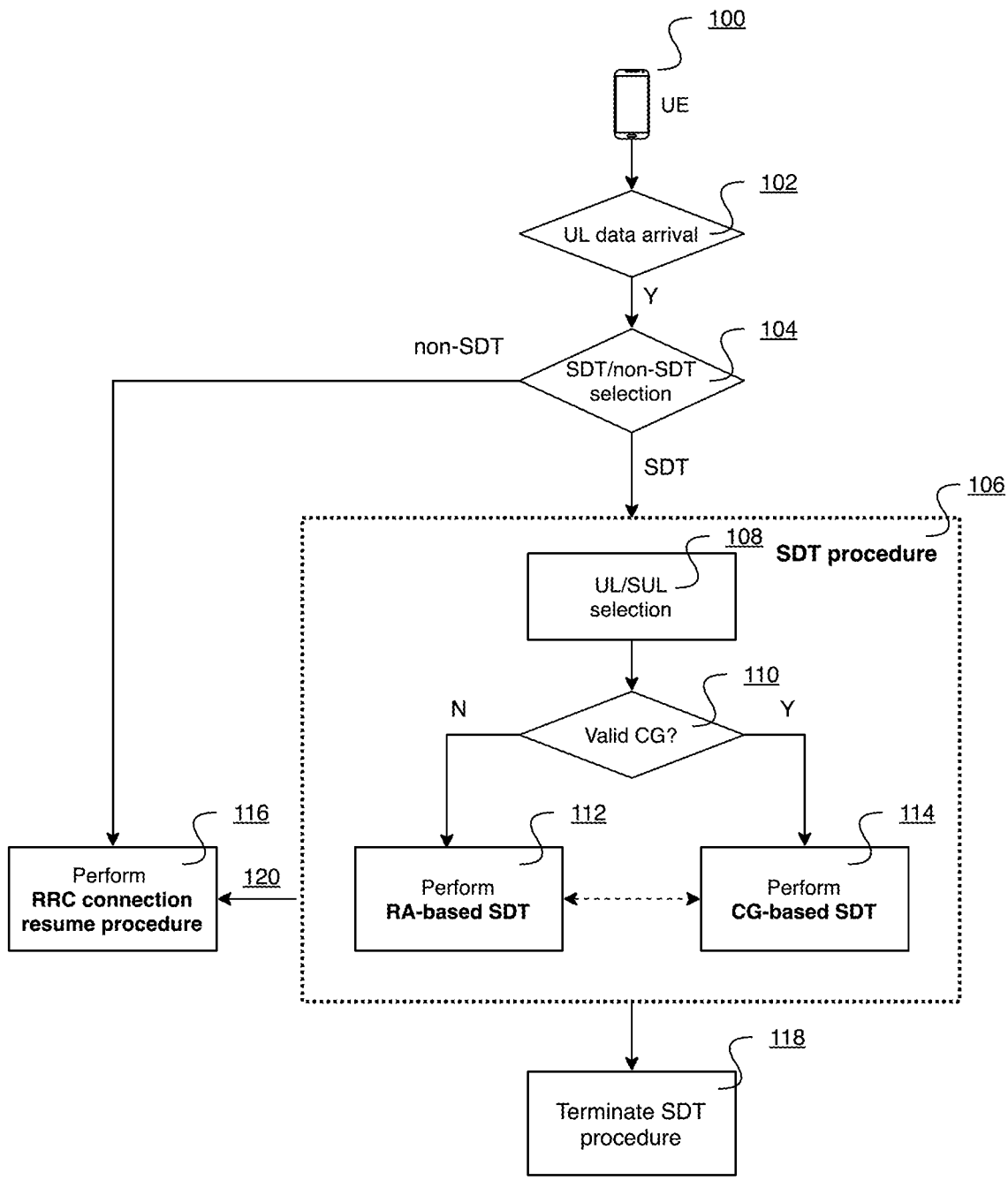
FIG. 1 is a flowchart illustrating a SDT procedure, according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is illustrated in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Further, the character "/" used herein generally represents that the former and latter associated objects are in an "or" relationship.

A UE may be referred to as PHY/MAC/RLC/PDCP/SDAP/RRC/AS/NAS layer/entity. The PHY/MAC/RLC/PDCP/SDAP/RRC/AS/NAS layer/entity may be referred to as the UE.

A NW may be a network node, a TRP, a cell (e.g., SpCell, PCell, PSCell, and/or SCell), an eNB, a gNB, and/or a base station.

Serving Cell: A PCell, a PSCell, or an SCell (Secondary Cell). The serving cell may be an activated or a deactivated serving cell.

SpCell: For Dual Connectivity operation, the term Special Cell refers to the PCell of the MCG or the PSCell of the SCG depending on if the MAC entity is associated to the MCG or the SCG, respectively. Otherwise, the term Special Cell refers to the PCell.

The terms "initiate", "trigger", "apply", "store", and "start" may be interchangeably used in some implementations of the present disclosure.

The terms "terminate", "stop", "release", "suspend", "discard", "end", "complete", "abort", and "cancel" may be interchangeably used in some implementations of the present disclosure.

The terms "period", "process", "phase", and "duration" may be interchangeably used in some implementations of the present disclosure.

The terms "resource" and "occasion" may be interchangeably used in some implementations of the present disclosure.

The terms "ongoing", "running", and "pending" may be interchangeably used in some implementations of the present disclosure.

The terms "mechanism", "scheme", and "functionality" may be interchangeably used in some implementations of the present disclosure.

The terms "mapped to" and "associated with" may be interchangeably used in some implementations of the present disclosure.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE, according to the present disclosure, may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

ABS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/ GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are applicable in NR: (1) low-density parity-check (LDPC) code and (2) polar code. The coding scheme adaptation may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

Small Data Transmission (SDT)

NR supports UEs with infrequent (e.g., periodic and/or non-periodic) data transmission in the RRC_INACTIVE state. Until 3GPP Rel-16, a UE in the RRC_INACTIVE state was unable to perform data transmission. Hence, the UE had to resume a connection (e.g., move to the RRC_CONNECTED state) for a DL data reception and/or a UL data transmission. In other words, connection setup and subsequently connection release to the RRC_INACTIVE state had to happen for every data transmission regardless of how small and infrequent the data packets were, which resulted in unnecessary power consumption and signaling overhead.

Signaling overhead due to the RRC_INACTIVE state UEs performing transmission of small data packets is a general problem and will become a critical issue as the number of UEs increases in NR, not only for network performance and efficiency but also for UE battery performance. In general, any device that has intermittent small data packets in the RRC_INACTIVE state will benefit from enabling small data transmission in the RRC_INACTIVE state.

An SDT in NR may involve a 2-step or 4-step RACH procedure or a configured grant (CG) type-1 configuration/procedure to enable the SDT in the RRC_INACTIVE state for NR. As described above, an SDT may be a UL data transmission by a UE in an RRC_INACTIVE state. The packet size (or data volume) of the UL data may be lower than a threshold. The UL data of the SDT may be transmitted during an SDT procedure. The UL data of the SDT may be transmitted via MSG3 (e.g., based on a 4-step RA procedure), via MSGA (e.g., based on a 2-step RA procedure), or via a CG resource (e.g., CG type 1). The UL data of the SDT may be transmitted based on a dynamic scheduling and/or a semi-persistent scheduling when the UE is in the RRC_INACTIVE state.

RA-Based and CG-Based SDT

An SDT may be supported by an RA-based SDT scheme or a CG-based SDT scheme.

A stored "configuration" in the UE Context may be used for the RLC bearer configuration.

The 2-step RACH or 4-step RACH procedure may be applied for RA-based SDT in the RRC_INACTIVE state.

The uplink small data may be sent in MSGA of a 2-step RACH procedure and/or MSG3 of a 4-step RACH procedure.

SDT may be configured by the network on a per-DRB basis.

A data volume threshold may be used for the UE to determine whether to perform an SDT procedure or a non-SDT procedure.

A UL/DL transmission following a UL SDT without the UE transitioning/entering to the RRC_CONNECTED state (e.g., from the RRC_INACTIVE state) may be supported.

When the UE is in the RRC_INACTIVE state, the UE may transmit multiple UL and DL packets as part of the same SDT procedure without transitioning/entering to the RRC_CONNECTED state (e.g., the UE remains in the RRC_INACTIVE state) via a dedicated grant.

When the UE receives an RRC release message (e.g., RRCRelease Information Element (IE)) with the suspend configuration, the UE may perform the following actions:

A MAC entity of the UE may be reset, and a default MAC cell group configuration may be released;

RLC entities (of the UE) for SRB1 may be re-established; and

SRBs and DRBs may be suspended except SRB0.

When the UE initiates an SDT procedure (e.g., for the first transmission of small data), the UE may re-establish at least the PDCP entities (for SDT) and resume the DRBs (for SDT) (e.g., along with the SRB1).

The first UL message (e.g., MSG3 for a 4-step RACH procedure, MSGA for a 2-step RACH procedure, and the CG transmission) may include at least the following contents that depend on the size of the message:

CCCH message

LCP may be used to determine a priority of the content below that includes:

DRB data from one or more DRBs that are configured by the network for an SDT;

MAC CEs (e.g., BSR); and

Padding bits.

The CCCH message may include ResumeMAC-I generated using the stored security key for RRC integrity protection.

New keys may be generated via the stored security context and an NCC value received in the previous RRCRelease message. New keys may be used for generating the data of DRBs that are configured for an SDT.

For CG-based SDT, a CG configuration for an SDT procedure may be included in the RRCRelease message.

For CG-based SDT, a new TA timer for TA maintenance specified for a CG-based SDT procedure in the RRC_INACTIVE state may be disclosed. The TA timer may be configured together with the CG configuration in the RRCRelease message.

For CG-based SDT, a CG configuration for an SDT procedure may be valid only in the same serving cell.

For CG-based SDT, the UE may perform a CG-based SDT procedure if at least the following criteria are fulfilled (1) user data is smaller than the data volume threshold; (2) CG resource is configured and valid; (3) UE has a valid TA.

For CG-based SDT, an association between CG resources and SSBs may be required for CG-based SDT.

For CG-based SDT, an SS-RSRP threshold may be configured for an SSB selection. A UE selects one of the SSBs with SS-RSRP above the threshold and selects the associated CG resource for a UL data transmission.

For CG-based SDT, a CG-SDT resource configuration may be provided to the UEs in the RRC_CONNECTED state via the RRCRelease message.

For CG-based SDT, CG-PUSCH resources may be separately configured for a NUL and a SUL.

For CG-based SDT, the RRCRelease message may be used to reconfigure or release the CG-SDT resources when the UE is in the RRC_INACTIVE state.

For CG-based SDT, the subsequent data transmission may use the CG resource or DG (e.g., a dynamic grant addressed to the UE's C-RNTI). The C-RNTI may be the same as the previous C-RNTI or may be configured explicitly by the network.

For CG-based SDT, a Timing Alignment Timer (TAT) may be started when the UE receives a TAT configuration from a gNB via the RRCRelease message and may be (re)started when the UE receives a command.

For CG-based SDT, the UE may release CG resources when the TAT expires in the RRC_INACTIVE state.

For RA-based SDT, up to two preamble groups (corresponding to two different payload sizes for MSGA/MSG3) may be configured by the network.

If a RACH procedure is initiated for an SDT (e.g., RA-based SDT procedure), the UE first performs RACH type selection as specified in MAC (e.g., as specified in 3GPP Rel-16).

For RA-based SDT, upon successful completion of a contention resolution, the UE may monitor the C-RNTI.

For RA-based SDT, a RACH resource (e.g., RO, preamble, and their combination) may be different between an SDT procedure and a non-SDT procedure (e.g., RRC connection resume procedure).

If ROs for an SDT and a non SDT are different, a preamble partitioning between the SDT and the non SDT is not needed.

If ROs for an SDT procedure and a non-SDT procedure are the same, preamble partitioning is needed.

For RA-based SDT, up to two preamble groups (corresponding to two different payload sizes for MSGA/MSG3) may be configured by the network.

For RA-based SDT, an RRCRelease message may be transmitted at the end to terminate the SDT procedure (from an RRC point of view). The RRCRelease message transmitted at the end of the SDT may include the CG resource.

An RSRP threshold may be used for a selection between an SDT procedure and a non-SDT procedure (e.g., RRC connection resume procedure).

For an SDT, the UE performs a UL carrier selection (e.g., UL and SUL selection).

If CG-SDT resources are configured on the selected UL carrier and are valid, the CG-based SDT is selected by the UE to perform the CG-based SDT procedure. Otherwise, If 2-step RA resources (for an SDT) are configured on the UL carrier and criteria to select 2-step RA (for an SDT) are met, the UE selects the 2-step RA (for an SDT);

If 4-step RA resources (for an SDT) are configured on the UL carrier and criteria to select 4-step RA (for an SDT) are met, the UE selects a 4-step RA (for an SDT);

The UE does not perform an SDT procedure (e.g., the UE performs an RRC connection resume procedure); and If both 2-step RA (for an SDT) resources and 4-step RA resources (for an SDT) are configured on the UL carrier, an RA type selection (e.g., 2-step and 4-step RA type selection) is performed based on the RSRP threshold.

SRB1 and SRB2 may be configured for an SDT (e.g., for carrying an RRC message and/or a NAS message).

When the UE initiates an SDT procedure and/or an RRC Resume procedure for an SDT initiation (e.g., for the first SDT transmission), the UE may also resume an SRB (e.g., SRB1, SRB2, and/or SRB3) that is configured for an SDT (e.g., in addition to SDT DRBs that are configured for an SDT).

A specific search space may be supported for monitoring the PDCCH addressed to the C-RNTI after successful completion of the RACH procedure during an RA-based SDT.

An RSRP threshold may be used for a selection between an SDT procedure and a non-SDT procedure, if configured (RSRP refers to the same RSRP measured for a carrier selection).

An RSRP threshold for a selection between an SDT procedure and a non-SDT procedure may be used for both CG-based SDT and RA-based SDT. An RSRP threshold for a selection between an SDT procedure and a non-SDT procedure may be the same for both CG-based SDT and RA-based SDT. An RSRP threshold for a carrier selection may be specific to an SDT (e.g., separately configured for an SDT).

An RSRP threshold for an RA type selection may be specific to an SDT (e.g., separately configured for an SDT).

A data volume threshold may be the same for a CG-based SDT and an RA-based SDT.

Switching/fallback from an SDT procedure to a non-SDT procedure (e.g., RRC connection resume procedure) may be supported.

Switching/fallback from a CG-based SDT to an RA-based SDT may be supported.

A UE may switch from an SDT procedure to a non-SDT procedure (e.g., RRC connection resume procedure) in the following cases:

Case 1: The UE receives, from the network, an indication to switch to the non-SDT procedure. For example, the network transmits the RRCResume message to the UE, and/or transmits the indication, to the UE, in RAR/fallbackRAR/DCI to switch the UE to the non-SDT procedure.

Case 2: The number of times that the initial UL transmission (in MSGA/MSG3/CG resources) fails reaches the configured number of times.

The UE may perform a PDCP re-establishment implicitly (e.g., without an explicit indication for the PDCP re-establishment) when the UE initiates an SDT procedure.

A PHR functionality/configuration may be supported for an SDT procedure.

A scheduling request (SR) resource (e.g., PDCCH resource for an SR) may not be configured for an SDT procedure. When the BSR is triggered by an SDT procedure, the UE may trigger an RA procedure because the SR resource is not available.

An SDT failure detection timer (e.g., T319a) may be started when the UE initiates an SDT procedure When the SDT failure detection timer (e.g., T319a) expires, the UE may transition to or enter the IDLE state and/or perform an RRC connection setup.

CG resources for an SDT may be configured at the same time on a NUL and a SUL.

A UE may start a timer/window after a UL transmission (e.g., for CG-based SDT).

CG resources for an SDT may be configured on BWPs other than an initial BWP.

CG resources per CG configuration may be associated with a set of SSB(s) configured by explicit signaling.

FIG. 1 is a flowchart illustrating an SDT procedure, according to an implementation of the present disclosure. It should be noted that although actions in figures of the present disclosure are illustrated as separate actions represented as independent blocks, these separately delineated actions should not be construed as necessarily order dependent. The order in which the actions are performed by the UE is not intended to be construed as a limitation, and any number of the disclosed blocks may be combined in any order to implement the method, or an alternate method. Moreover, one or more of the actions may be omitted in some implementations.

The UE 100 may be in the RRC_INACTIVE state and may be configured with an SDT configuration. The SDT configuration may be configured via the RRC release message (with the suspend configuration). The SDT configuration may include at least one of a RACH configuration, a CG configuration, or a configuration for SRB/DRB used for an SDT.

In action 102, UL data may arrive from an upper layer for transmission. The UL data may be associated with a specific DRB/SRB/LCH. The specific DRB/SRB/LCH may be configured for an SDT.

In action 104, for the UL data transmission, the UE may determine whether to initiate/trigger the SDT procedure (e.g., action 106) or initiate/trigger the RRC connection resume procedure (e.g., initiate a transmission of the RRCResumeRequest) (e.g., action 116). Specifically, the UE may determine whether to initiate/trigger the SDT procedure (e.g., action 106) or the RRC connection resume procedure (e.g., action 116) based on one or more criteria (e.g., DRB/SRB, data volume, and/or RSRP).

In some implementations, the UE may initiate the SDT procedure when/after at least one LCH/DRB/SRB that is configured for the SDT with pending data. For example, the pending data is available for transmission only for those LCHs/DRBs/SRBs for which the SDT is enabled. The LCH/DRB/SRB configured for the SDT may be resumed/re-established when the UE initiates the SDT procedure. Alternatively, the UE may initiate the RRC connection resume procedure when/after at least one LCH/DRB/SRB which is not configured for the SDT with pending data.

In some implementations, the UE may initiate the SDT procedure if a data volume for transmission (e.g., for an SDT) is lower than a configured threshold for the SDT. The data volume may count only the (total) volume of the LCHs/DRBs/SRBs configured for the SDT. Alternatively, the UE may initiate the RRC connection resume procedure if a data volume for transmission (e.g., for the SDT) is higher than a configured threshold for the SDT.

In some implementations, the UE may initiate the SDT procedure if an RSRP is larger than a configured RSRP threshold for the SDT. Alternatively, the UE may initiate the RRC connection resume procedure if an RSRP is lower than a configured RSRP threshold for the SDT.

In action 106, two types of SDT procedures are disclosed. One is based on an RA procedure (e.g., 2-step RA procedure or 4-step RA procedure), hereafter called RA-based SDT (e.g., action 112). The other is based on a CG (e.g., type 1 CG), hereafter called CG-based SDT (e.g., action 114). The UE may transmit the UL data (e.g., small data) via MSG3, MSGA, CG resource, and/or PUSCH resources during the SDT procedure.

In action 108, the UE may perform a UL carrier selection (e.g., if a SUL is configured in the cell, a UL carrier may be selected by the UE based on an RSRP threshold). After the UL carrier selection, the UE may perform the SDT procedure on the selected UL carrier (e.g., either UL or SUL).

In action 110, the UE may determine whether a CG resource/configuration is valid (during the SDT procedure) based on one or more of the following criterions:

In some implementations, the UE may determine whether a CG resource/configuration is valid based on whether the associated beam is valid. Specifically, the UE may determine whether the associated beam is valid based on an RSRP threshold. The RSRP threshold may be configured in the RRCRelease message or the CG configuration.

In some examples, if an RSRP of one beam is larger than the RSRP threshold, the UE may determine the CG resource/configuration is valid. If no RSRP of the beam is larger than the RSRP threshold, the UE may determine the CG resource/configuration is not valid.

In some implementations, the UE may determine whether a CG resource/configuration is valid based on whether a TA is valid. The UE may determine the CG resource/configuration is valid when the TA is valid. If the TA is not valid, the UE may determine the CG resource/configuration is not valid.

In some implementations, the UE may determine whether the TA is valid based on a TA timer. For example, the UE may determine the TA is valid when the TA timer is running. The UE may determine the TA is not valid when the TA timer is not running. The (parameter of) TA timer may be configured in the RRCRelease message and/or the CG configuration.

In some examples, the UE may determine whether the TA is valid based on an RSRP change volume. For example, the UE may determine the TA is not valid if the RSRP change is higher than a threshold. The threshold (for RSRP change) may be configured in the RRCRelease message or the CG configuration.

In some implementations, the UE may determine whether a CG resource/configuration is valid based on whether a CG configuration is valid.

In some examples, when the CG resource configuration is (re-)initialized, the UE may determine the CG resource configuration is valid.

In some examples, when the CG resource configuration is released/suspended, the UE may determine the CG resource configuration is invalid.

In some examples, the CG resource configuration may be configured in the RRCRelease message.

In some implementations, the UE may determine whether a CG resource/configuration is valid based on whether data is available for transmission for only those DRBs/SRBs/LCHs for which an SDT is enabled.

In some examples, the UE may be configured with one or more DRBs/SRBs/LCHs specifically for an SDT.

In some implementations, the UE may determine whether a CG resource/configuration is valid based on whether an RSRP is larger than the configured RSRP threshold for an SDT. The RSRP threshold may be configured in the RRCRelease message and/or the CG configuration.

In some implementations, the UE may determine whether a CG resource/configuration is valid based on whether a data volume for transmission is lower than a configured threshold for an SDT. The configured threshold may be configured in the RRCRelease message and/or the CG configuration.

In some implementations, the UE may determine whether a CG resource/configuration is valid based on an (explicit) indication received from the NW.

In some examples, the indication may indicate that a CG (associated with a beam) is valid or not. The indication my indicate whether a beam associated with a CG is valid or not.

In some implementations, the UE may determine whether a CG resource/configuration is valid based on whether a timer (e.g., T319 or an SDT failure detection timer (e.g., T319a)) is running. The timer may be configured in the RRCRelease message and/or the CG configuration.

In some examples, the UE may determine that the CG resource/configuration is valid when the timer is running. The UE may determine that the CG resource/configuration is not valid when the timer is not running or when the timer expires. The timer may be used to detect a failure of an SDT. The timer may be (re-)started upon transmission of UL data when the UE is in the RRC_INACTIVE state. The timer may be (re-)started upon transmission of a small data. The timer may be (re-)started upon transmission of the RRC resume request. The timer may be stopped upon reception of RRCResume, RRCSetup, RRCRelease, RRCRelease with suspendConfig, or RRCReject message, cell re-selection, and upon abortion of connection establishment by upper layers. When the timer expires, the UE may transition to or enter the RRC_IDLE state (e.g., with a specific RRC resume cause).

In action 112, if the UE determines that the CG resource/configuration is not valid (e.g., one of the criteria for CG validity is not satisfied), the UE may perform the RA-based SDT. For example, the UE may initiate an RA procedure. The RA procedure may be either a 2-step RA procedure or a 4-step RA procedure based on the selection by the UE (e.g., according to an RSRP threshold). The UE may perform the transmission of an RA preamble (e.g., via the preamble/RA resource/PRACH resource that is configured for an SDT). The UE may perform a UL transmission (e.g., for the SDT) via MSG3/MSGA.

In action 114, if the UE determines that the CG is valid (e.g., all the criteria for CG validity are satisfied), the UE may perform the CG-based SDT. For example, the UE may perform a UL transmission (for the SDT) via a CG resource.

In action 116, if the criteria (e.g., DRB/SRB, data volume, and/or RSRP) for initiating the SDT procedure is not satisfied, the UE may initiate an RRC connection resume procedure. (e.g., the UE may initiate transmission of the RRCResumeRequest).

In action 118, the SDT procedure may be terminated/stopped/completed by an indication from the NW (e.g., via the RRCRelease message), by a timer (e.g., an SDT failure detection timer (e.g., T319a) and/or T319), and/or a specific event.

In action 120, the UE performing the SDT procedure may fall back/switch to the RRC connection resume procedure. For example, when the UE receives an indication from the NW (e.g., an RRC resume/RRC Release message), the UE may stop/terminate/complete the SDT procedure and then may initiate an RRC connection resume procedure. In another example, if the initial UL transmission (e.g., in MSGA/MSG3/CG resources) fails a configured number of times, the UE may stop/terminate/complete the SDT procedure and then may initiate an RRC connection resume procedure.

RA-Based SDT

Figure 2:
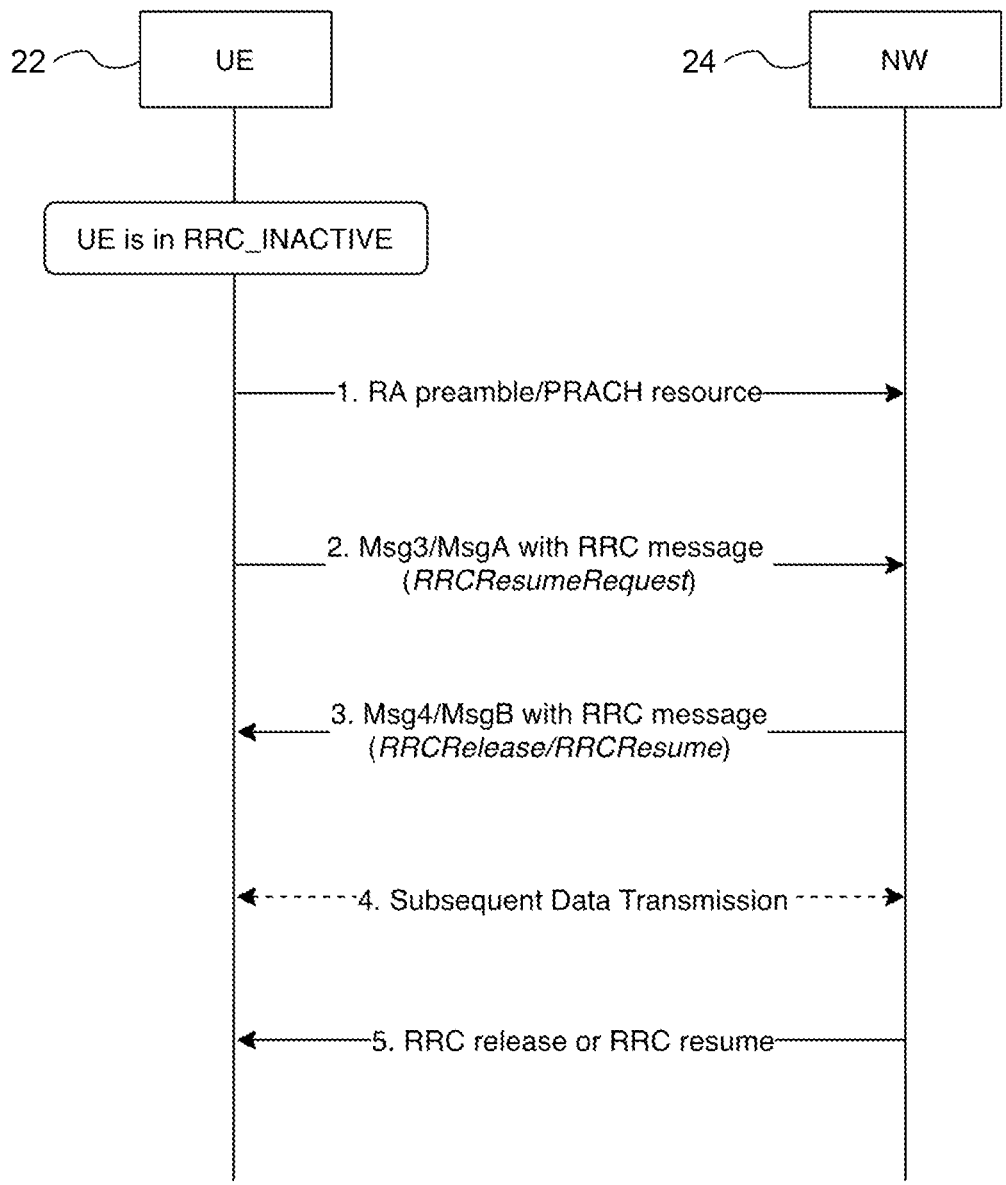
FIG. 2 is a communication diagram illustrating an RA-based SDT procedure, according to an implementation of the present disclosure.

FIG. 2 is a communication diagram illustrating an RA-based SDT procedure, according to an implementation of the present disclosure.

Step 1: When the UE 22 in the RRC_INACTIVE state has UL data available for transmission and an SDT procedure has been initiated, the UE 22 may initiate an RA-based SDT procedure for the transmission of the UL data (e.g., in a case that the UE 22 determines that the CG is not valid). The UE 22 may select either the 4-step RA type procedure or the 2-step RA type procedure. Moreover, the RA preamble/PRACH resource for the RA-based SDT procedure (e.g., RA preamble/PRACH resource with a small data indication) and for a normal RA procedure (e.g., RA preamble without a small data indication) may be different. In this case, the UE 22 may select the RA preamble/PRACH resource for the RA-based SDT procedure and may transmit the selected RA preamble/PRACH resource to the NW 24.

Step 2: After the UE 22 transmits the RA preamble/PRACH resource to the NW 24, the UE 22 may transmit an RRC message, MAC CE(s), and/or UL data via MSG3 (when the 4-step RA type procedure is selected) or MSGA (when the 2-step RA type procedure is selected). The RRC message may be the RRCResumeRequest message. In addition to the RRC message, a MAC CE (e.g., a BSR) and UL data (e.g., data associated with DRB(s) for an SDT) may be included in MSG3/MSGA as well.

Step 3: When the NW 24 transmits MSG4/MSGB to the UE 22, the UE 22 may monitor (Temporary C-RNTI)/C-RNTI/RA-RNTI/MSGB-RNTI for MSG4/MSGB that may carry a contention resolution ID. In addition, the NW 24 may transmit, to the UE 22, an RRC message via MSG4/MSGB. The RRC message may be an RRCRelease message (with the suspendConfig IE) or an RRCResume message. The UE 22 may stay in the RRC_INACTIVE state if the UE 22 receives the RRCRelease message (with the suspendConfig IE), or may transition to or enter the RRC_CONNECTED state if the UE 22 receives the RRCResume message.

Step 4: When the RA procedure for the SDT is successfully completed (e.g., the UE 22 receives MSG4/MSGB from the NW 24), the UE 22 may monitor a specific RNTI (e.g., C-RNTI) on a specific search space for subsequent data transmission. Subsequent data transmission may be the transmission of multiple UL and/or DL data packets as part of the SDT procedure without transitioning to or entering the RRC_CONNECTED state (e.g., the UE 22 is still in the RRC_INACTIVE state). The UE 22 may monitor PDCCH with a specific RNTI (e.g., C-RNTI) to receive the dynamic scheduling for UL and/or DL new transmission and/or the corresponding retransmission. The UE 22 may monitor PDCCH with a UE-specific RNTI (e.g., C-RNTI) to receive the dynamic scheduling for the retransmission of the UL transmission via CG resources.

Step 5: The NW 24 may send the RRCRelease message (with the suspendConfig IE) to keep the UE 22 in the RRC_INACTIVE state or transition the UE 22 to the RRC_IDLE state. Alternatively, the NW 24 may send the RRCResume message to transition the UE 22 to the RRC_CONNECTED state. When the UE 22 receives the RRCRelease message (with the suspendConfig IE) from the NW 24, the UE 22 may terminate the SDT procedure based on the RRCRelease message, stop monitoring the C-RNTI, and stay in the RRC_INACTIVE state.

CG-Based SDT

Figure 3:
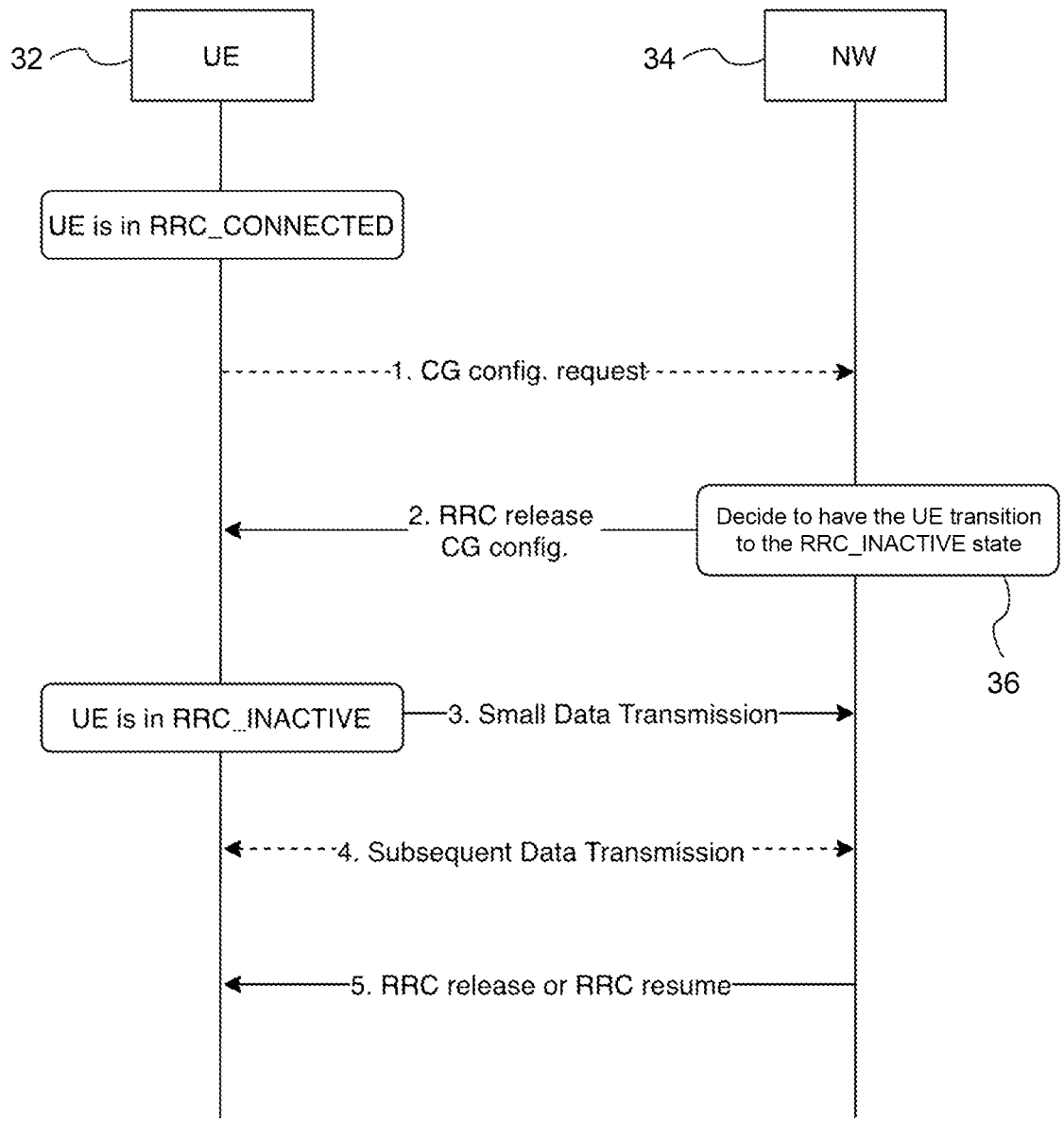
FIG. 3 is a communication diagram illustrating a CG-based SDT procedure, according to an implementation of the present disclosure.

FIG. 3 is a communication diagram illustrating a CG-based SDT procedure, according to an implementation of the present disclosure.

Step 1: When the UE 32 is in the RRC_CONNECTED state or the RRC_INACTIVE state, the UE 32 may transmit a CG configuration request to the NW 34 to indicate its preference on CG configuration for an SDT.

Step 2: The NW 34 may decide to transition the UE 32 to the RRC_INACTIVE state by transmitting the RRCRelease message (e.g., including the suspendConfig IE) to the UE 32. The RRCRelease message may include at least a CG configuration to configure the CG resources to the UE 32. The CG configuration may include, but is not limited to, the following information: CG periodicity, TBS, number for the implicit release of the CG resources, CG Timer, retransmission timer, number of HARQ process reserved for CG in SDT, RSRP threshold for SSB selection and association between SSB and CG resources, TA related parameters (e.g., TA timer), and so on.

Step 3: The UE 32 may perform an SDT procedure based on the CG resources (in the RRC_INACTIVE state) according to the CG configuration (e.g., configured in step 2). For example, the UE 32 may transmit UL data (e.g., small data) via the CG resources (during the SDT procedure).

Step 4: Subsequent data transmission may be the transmission of multiple UL or DL packets as part of the SDT procedure without the UE 32 transitioning to or entering the RRC_CONNECTED state (e.g., the UE 32 is still in the RRC_INACTIVE state). The UE 32 may monitor PDCCH with a specific RNTI (e.g., C-RNTI, CS-RNTI, and/or a specific RNTI) on a search space (e.g., configured by a CG configuration) to receive the dynamic scheduling for a UL or DL new transmission and/or the corresponding retransmission. The UE 32 may monitor PDCCH with a UE-specific RNTI (e.g., C-RNTI) to receive the dynamic scheduling for the retransmission of CG. The UE may perform subsequent data transmission via CG resources according to the CG configuration (e.g., configured in step 2).

Step 5: The NW 34 may transmit an RRCRelease message (with the suspendConfig IE) to keep the UE 32 in the RRC_INACTIVE state or transition the UE 32 to the RRC_IDLE state. Alternatively, the NW 34 may transmit an RRCResume message to transition the UE 32 to the RRC_CONNECTED state. When the UE 32 receives the RRCRelease message (with the suspendConfig IE) from the NW 34, the UE 32 may terminate the SDT procedure based on the RRCRelease message, stop monitoring the C-RNTI, and stay in the RRC_INACTIVE state.

Subsequent Transmission Period

Figure 4:
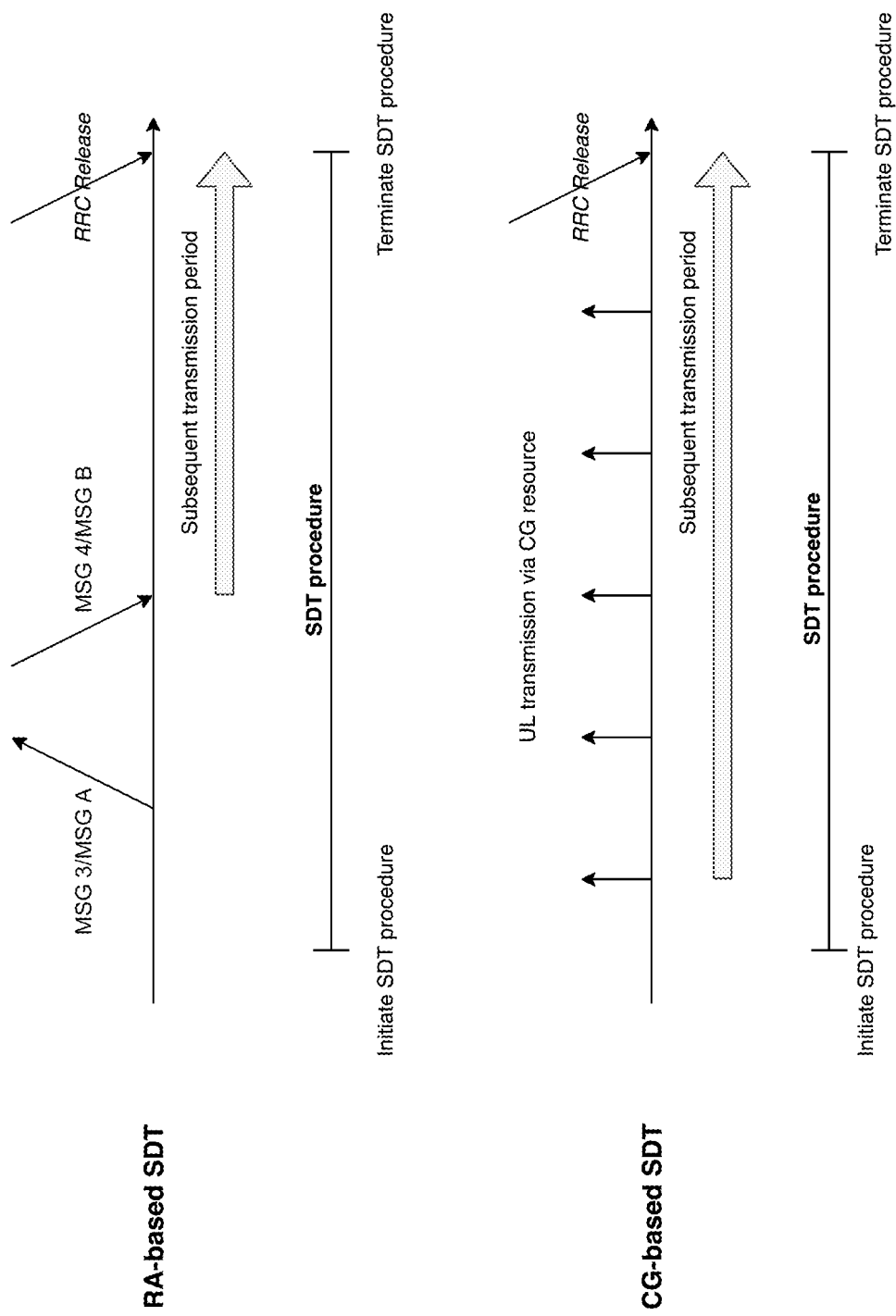
FIG. 4 is a timing diagram illustrating a subsequent transmission period of an SDT procedure, according to an implementation of the present disclosure.

FIG. 4 is a timing diagram illustrating a subsequent transmission period (or a subsequent transmission phase) of an SDT procedure, according to an implementation of the present disclosure. The duration of the subsequent transmission period is disclosed as follows:

In some implementations, the subsequent transmission period may be determined as a time period during an (RA-based or CG-based) SDT procedure. In some examples, the subsequent transmission period may be a time period when the SDT procedure is ongoing. In some examples, the subsequent transmission period may be a time period when/after a CG configuration is configured/initiated and the CG configuration is not released.

In some implementations, the UE may determine that the subsequent transmission period is started when/after the UE initiates the SDT procedure.

In some implementations, the UE may determine that the subsequent transmission period is started when/after the UE determines that a contention resolution of an RA procedure is successful and/or after the UE determines that the RA procedure is successfully completed. The RA procedure may be an RA-based SDT or initiated for an SDT.

In some implementations, the UE may determine that the subsequent transmission period is started when/after the UE is configured or (re-)initialized with the CG configuration. In some examples, the CG configuration may include a parameter that is used to indicate SDT scheduling.

In some implementations, the UE may determine the subsequent transmission period is started when/after the CG configuration is valid.

In some implementations, the UE may determine the subsequent transmission period is started when/after the UE transmits a UL message.

In some examples, the UL message may be transmitted via MSG1/MSG3/MSGA/CG resource/UL resource scheduled by MSG2/MSGB/MSG4 (during an SDT procedure) or on the UL resource that is (pre-)configured as part of an SDT configuration.

In some examples, the UL message may include an RRC resume request message (e.g., RRCResumeRequest, RRCResumeRequest1, and a CCCH message for SDT).

In some examples, the UL message may include small data (e.g., UL data associated with a specific SRB/DRB/LCH for an SDT).

In some examples, the UL message may include a MAC CE (e.g., BSR MAC CE).

In some implementations, the UE may determine that the subsequent transmission period is started when/after the UE receives a response from the NW.

In some examples, the response may be MSG2/MSG4/MSGB and/or a response for a UL transmission via the CG resource.

In some examples, the response may be used for a contention resolution of an RA procedure.

In some examples, the response may include an (HARQ/RRC) ACK/NACK message, and/or DFI (e.g., for UL transmission via the CG resource).

In some examples, the response may include a UL grant/DL assignment for a new transmission/retransmission. The response may be a PDCCH addressed to an RNTI (e.g., a C-RNTI, a CS-RNTI, a dedicated RNTI, an RNTI for SDT, and an RNTI for CG).

In some examples, the response may indicate a UL grant for a new transmission for the HARQ process used for the transmission of a UL transmission for small data (e.g., the UL message).

In some examples, the response may include a specific command (e.g., a TA command MAC CE).

In some examples, the response may include RRCResume, RRCSetup, RRCRelease, RRCRelease with SuspendConfig, RRCReestablishment, RRCReconfiguration, and/or RRCReject, etc.

In some implementations, the UE may determine that the subsequent transmission period is started when/after the UE receives an indication from the NW.

In some examples, the indication (with a specific value (e.g., TRUE or FALSE)) may be included in broadcast system information (e.g., SIB) to indicate that a CG transmission in the RRC_INACTIVE state is supported in the cell.

In some implementations, the UE may determine that the subsequent transmission period (and/or the SDT procedure) is terminated/stopped when/after the SDT procedure is terminated.

In some implementations, the UE may determine that the subsequent transmission period (and/or the SDT procedure) is terminated/stopped when/after the CG configuration is released/suspended/cleared.

In some implementations, the UE may determine that the subsequent transmission period (and/or the SDT procedure) is terminated/stopped when/after the CG configuration is invalid.

In some implementations, the UE may determine that the subsequent transmission period (and/or the SDT procedure) is terminated/stopped when/after the UE receives an indication from the NW.

In some examples, the indication may include RRCResume, RRCSetup, RRCRelease, RRCRelease with SuspendConfig, RRCReestablishment, and/or RRCReject, etc. The indication may be a PDCCH addressed to an RNTI (e.g., a C-RNTI, a CS-RNTI, a dedicated RNTI, an RNTI for SDT, and an RNTI for CG). The indication may indicate to the UE to terminate the SDT procedure and/or the subsequent transmission period (e.g., based on a field of the indication). The indication may indicate to the UE to initiate an RRC procedure (e.g., RRC connection resume procedure, RRC establishment procedure, and/or RRC reestablishment procedure). The indication may indicate to the UE to switch/fall back to a type of an SDT procedure (e.g., an RA-based SDT, a CG-based SDT, a 2-step RA procedure, or a 4-step RA procedure). The indication with a specific value (e.g., TRUE or FALSE) may be included in system information (e.g., SIB) to indicate that a CG transmission in the RRC_INACTIVE state is no longer supported in the cell. For example, when the UE receives the indication with a specific value (e.g., TRUE or FALSE), the UE may release/suspend the CG configuration.

In some implementations, the UE may determine that the subsequent transmission period (and/or the SDT procedure) is terminated/stopped when/after a timer/window expires.

Specifically, the timer/window may be an SDT failure/problem detection timer.

Specifically, the timer/window may be specifically configured for an SDT. The value of the timer/window may be configured via the RRCRelease message. The value of the timer/window may be configured via the RRCRelease message with the suspend configuration. The value of the timer/window may be configured via a configuration for an SDT. The value of the timer/window may be configured via a RACH configuration for an SDT. The value of the timer/window may be configured via a CG configuration for an SDT. The value of the timer/window may be configured via a UE-TimersAndConstants IE. The value of the timer/window may be configured via system information (e.g., a SIB).

Specifically, the timer/window may be a TA timer, ra-ResponseWindow, msgB-ResponseWindow, ra-ContentionResolutionTimer, configuredGrantTimer, cg-RetransmissionTimer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, T345, and/or a new Timer (e.g., T319a)

Specifically, the timer/window may be used for monitoring a response (e.g., for ACK/NACK). The timer/window may be a response window.

Specifically, the timer/window may be used for receiving a PDCCH/scheduling (e.g., for new transmission or retransmission) from the NW.

In some implementations, the UE may determine that the subsequent transmission period is terminated/stopped when/after the UE transitions to or enters the RRC_IDLE state or RRC_CONNECTED state (e.g., from the RRC_INACTIVE state).

In some implementations, the UE may determine that the subsequent transmission period is terminated/stopped/released when/after the UE performs a cell selection/reselection.

In some implementations, the UE may determine that the subsequent transmission period is terminated/stopped when an upper layer of the UE aborts a connection establishment.

In some implementations, the UE may determine that the subsequent transmission period is terminated/stopped when the UE performs a RAN notification area (RNA) update.

In some implementations, the UE may determine that the subsequent transmission period is terminated/stopped when/after the UE establishes/resumes an RRC connection on a cell that is different from the cell where the CG configuration was provided.

In some implementations, the UE may determine that the subsequent transmission period is terminated/stopped when/after the UE initiates an RRC re-establishment procedure. For example, the subsequent transmission period may be terminated/stopped after the UE transmits an RRCReestablishmentRequest to the network.

In some implementations, the UE may determine that the subsequent transmission period is terminated/stopped when/after the UE is indicated, by the network, to perform carrier switching (e.g., from a NUL to a SUL or vice versa).

In some implementations, the UE may determine that the subsequent transmission period is terminated/stopped when/after the UE is indicated, by the network, to perform (UL/DL) BWP switching.

In the subsequent transmission period, the UE may monitor the PDCCH to receive the possible (DL or UL) scheduling from the NW. The UE may monitor the PDCCH (during the SDT procedure and/or during the subsequent transmission period) based on a search space, a CORESET, and/or an RNTI. For example, the UE may monitor the PDCCH addressed to the C-RNTI after successful completion of the RA procedure for an SDT.

The Search Space (SS), as previously mentioned, may be one or more of the following options:

Option 1: Common Search Space
- common search space(s) configured in PDCCH-Config-Common;
- the type-1 PDCCH CSS set configured by ra-SearchSpace;
- the type-3 PDCCH CSS set;
- search space zero;
- a new common Search Space set configured via system information (e.g., SIB) or RRCRelease message; and
- search space with parameters of the search space(s) configured in the initial BWP.

Option 2: UE-Specific Search Space Set
- a UE-specific Search Space set configured via the RRCRelease message;
- a UE-specific Search Space set configured via MSG4/MSGB;
- a UE-specific search space set configured via PDCCH-Config;
- a UE-specific search space set configured via a configuration for an SDT;
- a search space with ID other than 0-39; and
- a search space set identified as a specific set for an SDT.

The CORESET, as previously mentioned, may be one or more of the following options:

Option 1: Common CORESET
- CORESET 0; and
- CORESET other than CORESET 0.

Option 2: UE-Specific CORESET Configuration
- a UE-specific CORESET configured via the RRCRelease message;
- a UE-specific CORESET configured via MSG4/MSGB;
- a UE-specific CORESET configured via a configuration for an SDT; and
- a CORESET with ID other than 0-14.

The RNTI, as previously mentioned, may be a C-RNTI, a CS-RNTI, an RNTI for SDT, an RNTI for CG, or a new RNTI other than SI-RNTI, RA-RNTI, MsgB-RNTI, TC-RNTI, P-RNTI, INT-RNTI, SFI-RNTI, TPC-PUSCH-RNTI, TPC-PUCCH-RNTI, TPC-SRS-RNTI, CI-RNTI, C-RNTI, MCS-C-RNTI, CS-RNTI(s), PS-RNTI, SL-RNTI, SL-CS-RNTI, or SL Semi-Persistent Scheduling V-RNTI.

BSR/SR/RA in an SDT Procedure

The Scheduling Request (SR) may be used for requesting Uplink Shared Channel (UL-SCH) resources for a new transmission. The UE or a MAC entity of the UE may be configured with zero, one, or more SR configurations. An SR configuration may include a set of PUCCH resources for an SR (e.g., across different BWPs and/or cells). An SR configuration corresponds to one or more logical channels. Each logical channel may be mapped to zero or one SR configuration that is configured by an RRC layer. The SR configuration of the logical channel that is triggered for a BSR may be considered as an SR configuration corresponding to a triggered SR. When an SR is triggered, the SR may be considered as pending until the SR is canceled.

As long as at least one SR is pending, for each pending SR, the UE (or the MAC entity of the UE) may determine if the UE (or the MAC entity of the UE) has no valid PUCCH resource configured for the pending SR. If the UE (or the MAC entity of the UE) has no valid PUCCH resource configured for the pending SR, the UE (or the MAC entity of the UE) may initiate an RA procedure (e.g., on the SpCell) and/or cancel the pending SR.

It is noted that when the UE receives an RRC release (e.g., including a suspend configuration) message or an SDT configuration, the UE may perform a MAC reset, consider all TA timers as expired, and may release a PUCCH configuration and/or a Scheduling Request Resource Configuration.

For an SDT, the PUCCH resources for an SR (e.g., an SR configuration) may not be configured. For example, the UE may not be configured with a PUCCH configuration for an SR (e.g., SR configuration) when the UE performs an SDT procedure (e.g., in the RRC_INACTIVE state). If the UE triggers an SR, and there is at least one pending SR (e.g., for a triggered B SR), the UE may initiate an RA procedure and/or cancel the pending SR when the UE determines that no valid PUCCH resource configured for the pending SR exists (e.g., when the PUCCH resource for an SR is not configured).

When the UE performs an SDT procedure, the UE may trigger a BSR and may trigger an SR (for the triggered BSR). Since no configured PUCCH resource exists for the SR, the UE may initiate an RA procedure for requesting the PUCCH resource. In addition, as previously mentioned, a subsequent transmission period is applied for an SDT. In the subsequent transmission period, the UE may monitor the PDCCH (e.g., to receive the possible (DL and/or UL) scheduling from the NW). The UE may monitor the PDCCH (during the SDT procedure or during the subsequent transmission period) based on a search space, a CORESET, and/or an RNTI. For example, the UE may monitor the PDCCH addressed to the C-RNTI after successful completion of the RA procedure for an SDT. Since the UE may receive the possible (DL and/or UL) scheduling from the NW, the UE may not need to initiate an RA procedure (e.g., when there is a triggered BSR, a triggered SR, a pending SR, and/or no configured PUCCH resource for an SR).

In the present disclosure, some methods on how/when to trigger a BSR, trigger an SR, and/or initiate an RA procedure in the SDT procedure (e.g., in the subsequent transmission period of the SDT procedure) are disclosed.

Event-Based

In some implementations, the UE may not trigger a BSR, trigger an SR, and/or initiate an RA procedure when the UE performs the SDT procedure (e.g., in the subsequent transmission period of the SDT procedure).

In some examples, when the UE performs the SDT procedure (e.g., in the subsequent transmission period of the SDT procedure), the UE may not trigger a specific BSR.

More specifically, the specific BSR may be a regular BSR, a periodic BSR, or a padding BSR.

More specifically, the UE may not be configured with a periodic BSR timer and/or a retransmission BSR timer. For example, the field of the IE of the periodic BSR timer and/or the retransmission BSR timer may be absent.

More specifically, the value of the periodic BSR timer and/or retransmission BSR timer may be configured as zero or infinity.

In some examples, when the UE performs the SDT procedure (e.g., in the subsequent transmission period of the SDT procedure), the UE may not trigger an SR (e.g., for the triggered BSR).

More specifically, when the UE performs the SDT procedure (e.g., in the subsequent transmission period of the SDT procedure), and if a BSR has been triggered, the UE may not trigger an SR (e.g., for the triggered BSR).

In some examples, when the UE performs the SDT procedure (e.g., in the subsequent transmission period of the SDT procedure), and if there is at least one pending SR, and the UE (or the MAC entity of the UE) has no valid PUCCH resource configured for the pending SR, the UE may not initiate an RA procedure. In this case, the UE may or may not cancel the pending SR.

In some examples, the pending SR may be triggered for a specific BSR.

In some implementations, when the UE performs the SDT procedure (e.g., in the subsequent transmission period of the SDT procedure) the UE may trigger a BSR, trigger an SR, and/or initiate an RA procedure if some criteria are satisfied.

In some examples, when the UE performs the SDT procedure (e.g., in the subsequent transmission period of the SDT procedure), the UE may trigger a specific BSR.

More specifically, the specific BSR may be a regular BSR, a periodic BSR, or a padding BSR.

In some examples, when the UE performs the SDT procedure (e.g., in the subsequent transmission period of the SDT procedure), the UE may trigger a specific BSR by a specific LCH/RB. In other words, the UE may not trigger the specific BSR by other LCHs/RBs.

More specifically, the specific LCH/RB may be configured for an SDT.

In some examples, when the UE performs the SDT procedure (e.g., in the subsequent transmission period of the SDT procedure), the UE may trigger an SR (e.g., for the triggered BSR).

More specifically, when the UE performs the SDT procedure (e.g., in the subsequent transmission period of the SDT procedure), and if a specific B SR has been triggered, the UE may not trigger an SR (e.g., for the triggered BSR).

In some examples, when the UE performs the SDT procedure (e.g., in the subsequent transmission period of the SDT procedure), in a case that there is at least one pending SR, and the UE (or the MAC entity of the UE) has no valid PUCCH resource configured for the pending SR, the UE may initiate an RA procedure if the pending SR is triggered for a specific BSR. In this case, the UE may or may not cancel the pending SR.

More specifically, the specific BSR may be a regular BSR, a periodic BSR, or a padding B SR.

More specifically, the specific BSR may be triggered by the specific LCH/RB.

More specifically, when the UE initiates an RA procedure, the UE may transmit the preamble/PRACH resource configured for an SDT during the RA procedure.

More specifically, when the UE initiates an RA procedure, the UE may select the 2-step RA type for the RA procedure.

Indication/Parameter-Based

In some implementations, an indication/parameter is used for indicating whether a UE can trigger a BSR, trigger an SR, and/or initiate an RA procedure when the UE performs the SDT procedure (e.g., in the subsequent transmission period of the SDT procedure).

Specifically, the indication/parameter may be logical Channel SR-Mask.

Specifically, the indication/parameter may be a mapping restriction for an LCH.

Specifically, the indication/parameter may be configured in the logical channel configuration.

Specifically, the indication/parameter may be configured in the default RB configuration.

Specifically, the indication/parameter may be included in RRCResume, RRC Setup, RRCRelease, RRCRelease with SuspendConfig, RRCReestablishment, RRCReconfiguration, and RRCReject, etc.

Specifically, the indication/parameter may be an RRC configuration, a MAC CE, and/or a DCI.

Specifically, the indication/parameter may be configured in an SDT configuration.

Specifically, the indication/parameter may be configured in an SR configuration.

Specifically, the indication/parameter may be configured in a BSR configuration.

Specifically, the indication/parameter may be configured in an RA configuration.

In one example, when the UE performs the SDT procedure (e.g., in the subsequent transmission period of the SDT procedure), the UE may not trigger a specific BSR if the indication/parameter indicates a first value.

More specifically, the specific BSR may be a regular BSR, a periodic BSR, or a padding BSR.

In some examples, when the UE performs the SDT procedure (e.g., in the subsequent transmission period of the SDT procedure), the UE may not trigger an SR (e.g., for the triggered BSR) if the indication/parameter indicates a first value.

More specifically, when the UE performs the SDT procedure (e.g., in the subsequent transmission period of the SDT procedure), and if the specific BSR has been triggered, the UE may not trigger an SR (e.g., for the triggered BSR) if the indication/parameter indicates a first value.

In some examples, when the UE performs the SDT procedure (e.g., in the subsequent transmission period of the SDT procedure), in a case there is at least one pending SR, and the UE (or the MAC entity of the UE) has no valid PUCCH resource configured for the pending SR, the UE may not initiate an RA procedure if the indication/parameter indicates a first value. In this case, the UE may or may not cancel the pending SR.

More specifically, the pending SR may be triggered for a specific BSR.

In some implementations, when the UE performs the SDT procedure (e.g., in the subsequent transmission period of the SDT procedure) and the indication/parameter indicates a second value, the UE may trigger a BSR, trigger an SR, and/or initiate an RA procedure if some criteria are satisfied.

In some examples, when the UE performs the SDT procedure (e.g., in the subsequent transmission period of the SDT procedure), the UE may trigger a specific BSR if the indication/parameter indicates a second value.

More specifically, the specific BSR may be a regular BSR, a periodic BSR, or a padding BSR.

In some examples, when the UE performs the SDT procedure (e.g., in the subsequent transmission period of the SDT procedure), the UE may trigger a specific BSR by a specific LCH/RB if the indication/parameter indicates a second value. In other words, the UE may not trigger the specific BSR by other LCHs/RBs.

More specifically, the specific LCH/RB may be configured for an SDT.

In some examples, when the UE performs the SDT procedure (e.g., in the subsequent transmission period of the SDT procedure), the UE may trigger an SR (e.g., for the triggered BSR) if the indication/parameter indicates a second value.

More specifically, when the UE performs the SDT procedure (e.g., in the subsequent transmission period of the SDT procedure), and the specific BSR has been triggered, the UE may not trigger an SR (e.g., for the triggered BSR) if the indication/parameter indicates a second value.

In some examples, when the UE performs the SDT procedure (e.g., in the subsequent transmission period of the SDT procedure), in a case there is at least one pending SR, and the UE (or the MAC entity of the UE) has no valid PUCCH resource configured for the pending SR, the UE may initiate an RA procedure if the indication/parameter indicates a second value. In this case, the UE may or may not cancel the pending SR.

More specifically, the specific BSR may be a regular BSR, a periodic BSR, or a padding BSR.

More specifically, the specific BSR may be triggered by the specific LCH/RB.

More specifically, when the UE initiates an RA procedure, the UE may transmit the preamble/PRACH resource configured for an SDT during the RA procedure.

More specifically, when the UE initiates an RA procedure, the UE may select the 2-step RA type for the RA procedure.

Timer-Based

In some implementations, the UE may determine whether to trigger a BSR, trigger an SR, and/or initiate an RA procedure based on a timer when the UE performs the SDT procedure (e.g., in the subsequent transmission period of the SDT procedure). The timer may be a prohibit timer or a valid timer. In some examples, the timer may be an SDT-specific timer.

More specifically, when the UE initiates an RA procedure, the UE may transmit the preamble/PRACH resource configured for an SDT during the RA procedure.

More specifically, when the UE initiates an RA procedure, the UE may select the 2-step RA type for the RA procedure.

In some implementations, the UE may determine whether to trigger a BSR, trigger an SR, and/or initiate an RA procedure based on whether a timer (e.g., the SDT-specific timer) is running.

Specifically, the timer may be logicalChannelSR-DelayTimer,

Specifically, the timer may be an SDT failure/problem detection timer.

Specifically, the timer may be specifically configured for an SDT. The value of the timer may be configured via an RRC release message. The value of the timer may be configured via the RRC release message with a suspend configuration. The value of the timer may be configured via a configuration for an SDT. The value of the timer may be configured via a RACH configuration for an SDT. The value of the timer may be configured via a CG configuration for an SDT. The value of the timer may be configured via a UE-TimersAndConstants IE. The value of the timer may be configured via system information (e.g., a SIB).

Specifically, the timer may be TA timer, ra-ResponseWindow, msgB-ResponseWindow, ra-ContentionResolutionTimer, configuredGrantTimer, cg-RetransmissionTimer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, T345, and/or T319a.

Specifically, the timer may be used for monitoring a response (e.g., for ACK/NACK). The timer may be a response window.

Specifically, the timer may be used for the UE to receive a PDCCH/scheduling (e.g., for a new transmission or retransmission) from the NW.

In some implementations, the UE may not trigger a specific BSR, not trigger an SR, and/or not initiate an RA procedure, if the timer is running.

In some implementations, the UE may trigger a specific BSR, trigger an SR, and/or initiate an RA procedure if the timer (e.g., the SDT-specific timer) is not running.

In some implementations, the UE may trigger a specific BSR, trigger an SR, and/or initiate an RA procedure if the timer is running.

In some implementations, the UE may not trigger a specific BSR, not trigger an SR, and/or not initiate an RA procedure if the timer (e.g., the SDT-specific timer) is not running.

In some examples, the UE may (re)start or stop the timer when the UE initiates an SDT procedure.

In some examples, the UE may (re)start or stop the timer when the UE is configured or (re-)initialized with a CG configuration/procedure (for an SDT) and/or when the UE determines that a CG configuration (for an SDT) is valid.

In some examples, the UE may (re)start or stop the timer when the UE initiates a (2-step or 4-step) RA procedure (for an SDT).

In some examples, the UE may (re)start or stop the timer when the UE enters/starts the subsequent transmission period of an SDT procedure.

In some examples, the UE may (re)start or stop the timer when the UE determines that a contention resolution of an RA procedure (for an SDT) is successful for an RA procedure.

In some examples, the UE may (re)start or stop the timer when the UE determines that the RA procedure (for an SDT) is successfully completed.

In some examples, the UE may (re)start or stop the timer when the UE transmits a UL message.

The UL message may be transmitted via MSG1/MSG3/MSGA/CG resource/UL resource scheduled by MSG2/MSGB/MSG4 (during the SDT procedure) or on the UL resource being (pre-)configured as part of an SDT configuration.

The UL message may include an RRC resume request message (e.g., RRCResumeRequest, RRCResumeRequest1, and a CCCH message for SDT).

The UL message may include small data (e.g., UL data associated with a specific SRB/DRB/LCH for an SDT).

The UL message may include a MAC CE (e.g., BSR MAC CE).

In some examples, the UE may (re)start or stop the timer when the SDT procedure is terminated/completed/failed/stopped/released/aborted by the UE. In one alternative, the UE may reset a MAC entity when the SDT procedure is terminated/completed/failed/stopped/released/aborted by the UE.

In some examples, the UE may (re)start or stop the timer when the UE performs a fallback from an SDT procedure to a non-SDT procedure (e.g., an RRC connection resume procedure, RRC establishment procedure, and a RRC reestablishment procedure). In one alternative, the UE may reset a MAC entity when the UE performs a fallback from an SDT procedure to a non-SDT procedure.

In some examples, the UE may (re)start or stop the timer when/after the UE initiates a transmission for a specific message.

The specific message may be a CCCH message (e.g., RRCSetupRequest, RRCResumeRequest, RRCResumeRequest1, RRCReestablishmentRequest, RRCSystemInfoRequest, and an RRC message for an SDT).

In some examples, the UE may (re)start or stop the timer when the UE receives an indication from the NW.

The indication may be an RRC configuration, a MAC CE, or a DCI.

The indication may be MSG2/MSG4/MSGB and/or a response for a UL transmission via a CG resource.

The indication may be used for a contention resolution of an RA procedure.

The indication may include an (HARQ/RRC) ACK/NACK message, and/or DFI (e.g., for UL transmission via a CG resource).

The indication may include a UL grant/DL assignment for a new transmission/retransmission. The indication may be a PDCCH addressed to an RNTI (e.g., a C-RNTI, a CS-RNTI, a dedicated RNTI, an RNTI for SDT, and an RNTI for a CG).

The indication may indicate a UL grant for a new transmission for a HARQ process used for the transmission of a UL transmission for small data (e.g., the UL message).

The indication may include a specific command (e.g., a TA command MAC CE).

The indication may include RRCResume, RRCSetup, RRCRelease, RRCRelease with SuspendConfig, RRCReestablishment, RRCReconfiguration, and RRCReject, etc.

More specifically, the value of the timer may be configured as zero or infinity.

Signaling Radio Bearer (SRB)

In NR, radio bearers (RB) can be categorized into two groups: data radio bearers (DRB) for user plane (UP) data and signaling radio bearers (SRB) for control plane (CP) data.

The SRB may be used to carry RRC and/or NAS messages. Specifically, the SRB may be used for the transmission of a positioning measurement report, tracking area update (TAU), ULInformationTransfer, DLInformationTransfer, etc.

More specifically, the following SRBs may be defined:

SRB0 is for RRC messages using the CCCH logical channel;

SRB1 is for RRC messages that may include a piggy-backed NAS message as well as for NAS messages prior to the establishment of SRB2, all using a DCCH logical channel;

SRB2 is for NAS messages and for RRC messages that include logged measurement information, all using a DCCH logical channel. SRB2 has a lower priority than SRB1 and may be configured by the network after AS security activation;

SRB3 is for specific RRC messages when UE is in (NG)EN-DC or NR-DC, all using a DCCH logical channel.

In an SDT, except for the DRB, the SRB (e.g., SRB1, SRB2, and/or SRB3) may also be configured for small data transmission when the UE is in the RRC_INACTIVE state.

When the UE initiates an SDT procedure (e.g., an RRC connection resume procedure for SDT initiation (e.g., for the first SDT transmission)), the UE may also resume the SRB (e.g., SRB1, SRB2, and/or SRB3) that is configured for an SDT, in addition to SDT DRBs that are configured for an SDT RB Configuration For an SDT, the UE may or may not be configured with a radio bearer configuration (e.g., via radioBearerConfig and/or radioBearerConfig2). If the UE is not configured with a radio bearer configuration, the UE may need to apply a default radio bearer configuration (e.g., default SRB configuration). In the present disclosure, some implementations for radio bearer configurations are disclosed.

In some implementations, a radio bearer configuration (e.g., radioBearerConfig) may include one or more parameters/IEs (e.g., srb-ToAddModList, srb3-ToRelease, drb-ToAddModList, drb-ToReleaseList, securityConfig, etc).

In some implementations, a radio bearer configuration may be referred to as a default RB configuration (e.g., default SRB configurations and/or default DRB configurations). The default RB configuration may include some IEs (e.g., PDCP-config, ul-AM-RLC, dl-AM-RLC, logicalChannelIdentity, LogicalChannelConfig, priority, etc.).

In some implementations, a radio bearer configuration may be indicated by the NW via a specific indication.

The specific indication may be system information (e.g., a SIB).

The specific indication may be used to configure an SDT configuration, used to configure an RA configuration for an SDT, or used to configure a CG configuration for an SDT.

The specific indication may be RRCResume, RRCSetup, RRCRelease, RRCRelease with SuspendConfig, RRCReestablishment, RRCReconfiguration, or RRCReject.

The specific indication may be MSG2/MSG4/MSGB. The specific indication may be used for a contention resolution of an RA procedure.

The specific indication may be a response for a UL transmission via the CG resource. The specific indication may include a feedback information (e.g., ACK/NACK, DFI).

The specific indication may be a PDCCH transmission addressed to an RNTI (e.g., a C-RNTI, a CS-RNTI, a dedicated RNTI, an RNTI for SDT, and an RNTI for CG).

The specific indication may contain a UL grant/DL assignment for a new transmission/retransmission.

In some implementations, if the UE is configured with a radio bearer configuration that is indicated by the UE via the specific indication, the UE may apply/store the indicated radio bearer configuration and may not apply/store the default radio bearer configuration. More specifically, the UE may replace/use/apply/store the values for the parameter/IEs of radio bearer configuration configured by the indicated radio bearer configuration and may not use/apply/store the values for the parameter/IEs of the default radio bearer configuration. More specifically, if the UE is configured with a radio bearer configuration that is indicated by the NW via the specific indication, the UE may ignore or release the default radio bearer configuration.

In some implementations, if the UE is not configured with a radio bearer configuration that is indicated by the NW via the specific indication, the UE may apply/store the default radio bearer configuration.

More specifically, the radio bearer configuration and/or the default radio bearer may be configured for an SDT.

Applying the RB Configuration

In some implementations, the UE may apply the RB configuration (and/or apply the default radio bearer configuration) when the UE receives an indication from the NW. More specifically, the indication may indicate whether the UE should apply the RB configuration (and/or apply the default Radio bearer configuration). More specifically, the indication may enable/disable the RB configuration/functionality and/or the default radio bearer configuration. For example, if the indication enables the RB configuration/functionality, the UE may apply the RB configuration (and/or apply the default radio bearer configuration). More specifically, the UE may apply the RB configuration of SRB0, SRB1, SRB2, SRB3, and/or DRB(s). More specifically, the indication may indicate which RB(s) configuration should be applied.

In some examples, the indication may include RRCResume, RRCSetup, RRCRelease, RRCRelease with SuspendConfig, RRCReestablishment, RRCReconfiguration, and RRCReject, etc.

In some examples, the indication may be an RRC configuration, a MAC CE, and/or a DCI.

In some examples, the indication may be MSG2/MSG4/MSGB and/or a response for a UL transmission via the CG resource.

In some examples, the indication may be used for a contention resolution of an RA procedure.

In some examples, the indication may contain a UL grant/DL assignment for a new transmission/retransmission. The indication may be a PDCCH addressed to an RNTI (e.g., a C-RNTI, a CS-RNTI, a dedicated RNTI, an RNTI for SDT, and an RNTI for CG).

In some implementations, the UE may apply the RB configuration (and/or apply the default radio bearer configuration) when the UE initiates an SDT procedure. The SDT procedure may be an RA-based SDT procedure or a CG-based SDT procedure.

In some examples, when UL data (associated with a specific RB/LCH that is configured for an SDT) arrives in the UE for a transmission, the UE may initiate an SDT procedure, and the UE may apply the RB configuration (and/or apply the default radio bearer configuration).

In some examples, the UE may apply the RB configuration (and/or apply the default radio bearer configuration) when the UE is configured or (re-)initialized with a CG configuration/procedure (for an SDT) and/or when the UE determines that a CG configuration (for an SDT) is valid.

In some examples, the UE may apply the RB configuration (and/or apply the default radio bearer configuration) when the UE initiates an RA procedure (for an SDT).

In some implementations, the UE may apply the RB configuration (and/or apply the default radio bearer configuration) for a specific RB(s) (e.g., SRB0, SRB1, SRB2, SRB3, and/or DRB(s)). More specifically, the specific RB(s) may be configured for an SDT. More specifically, the UE may not apply the RB configuration for the RB(s) that are not configured for an SDT.

In some implementations, the UE may apply the RB configuration (and/or apply the default radio bearer configuration) when the UE resumes the corresponding RB(s). For example, when the UE resumes an RB(s) (e.g., when the UE initiates an SDT procedure), the UE may apply the RB configuration(s) for the resumed RB(s).

In some implementations, the UE may apply the RB configuration (and/or apply the default radio bearer configuration) when/after the UE initiates a transmission of a specific message.

The specific message may be a CCCH message (e.g., RRCSetupRequest, RRCResumeRequest, RRCResumeRequest1, RRCReestablishmentRequest, RRCSystemInfoRequest, and an RRC message for an SDT).

In some implementations, the UE may apply the RB configuration (and/or apply the default radio bearer configuration) when UE enters/starts the subsequent transmission period of an SDT procedure.

In some examples, the UE may apply the RB configuration (and/or apply the default radio bearer configuration) when the UE determines that a contention resolution of an RA procedure (for an SDT) is successful.

In some examples, the UE may apply the RB configuration (and/or apply the default radio bearer configuration) when the UE determines that the RA procedure (for an SDT) is successfully completed.

In some examples, the UE may apply the RB configuration (and/or apply the default radio bearer configuration) when the UE transmits a UL message.

The UL message may be transmitted via MSG1/MSG3/MSGA/CG resource/UL resource scheduled by MSG2/MSGB/MSG4 (during an SDT procedure) or on the UL resource that is (pre-)configured as part of an SDT configuration.

The UL message may include an RRC resume request message (e.g., RRCResumeRequest, RRCResumeRequest1, and a CCCH message for SDT).

The UL message may include small data (e.g., UL data associated with a specific SRB/DRB/LCH for an SDT).

The UL message may include a MAC CE (e.g., BSR MAC CE).

In some implementations, the UE may apply the RB configuration (and/or apply the default radio bearer configuration) when the UE receives an RB configuration (e.g., the RB configuration may be indicated by the NW via a specific indication).

In some implementations, the UE may apply the RB configuration (and/or apply the default radio bearer configuration) when the UE (re)selects a suitable cell.

In some examples, if the UE performs a cell (re)selection procedure and establish connection with a new cell (e.g., upon transmission of an RRCSetupRequest, RRCResumeRequest, RRCResumeRequest1, RRCReestablishmentRequest, RRCSystemInfoRequest on a new cell), the UE may apply the RB configuration (and/or apply the default radio bearer configuration).

Priority of Radio Bearer/LCH

An LCP procedure may be applied whenever a new transmission is performed. The RRC layer of the NW may control the scheduling of uplink data by signaling for each logical channel (per MAC entity) based on one or more of the following IEs:

priority, where an increasing priority value indicates a lower priority level;
prioritisedBitRate that sets the Prioritized Bit Rate (PBR);
bucketSizeDuration that sets the Bucket Size Duration (BSD).

According to the LCP procedure, when the UE performs a new transmission (for a UL resource indicated/configured by a UL grant), the MAC entity of the UE may allocate the UL resource to MAC CE(s) and/or data from the LCH(s). Then, the LCH(s) selected for the UL resources are allocated to UL resources in a decreasing priority order. For the priority of an LCH, it is noted that increasing priority value indicates a lower priority level. In other words, if the configured priority value of a first LCH is lower than a second LCH, the UL resource is allocated to the first LCH before the second LCH since the priority level of the first LCH is higher than the second LCH.

Figure 5:
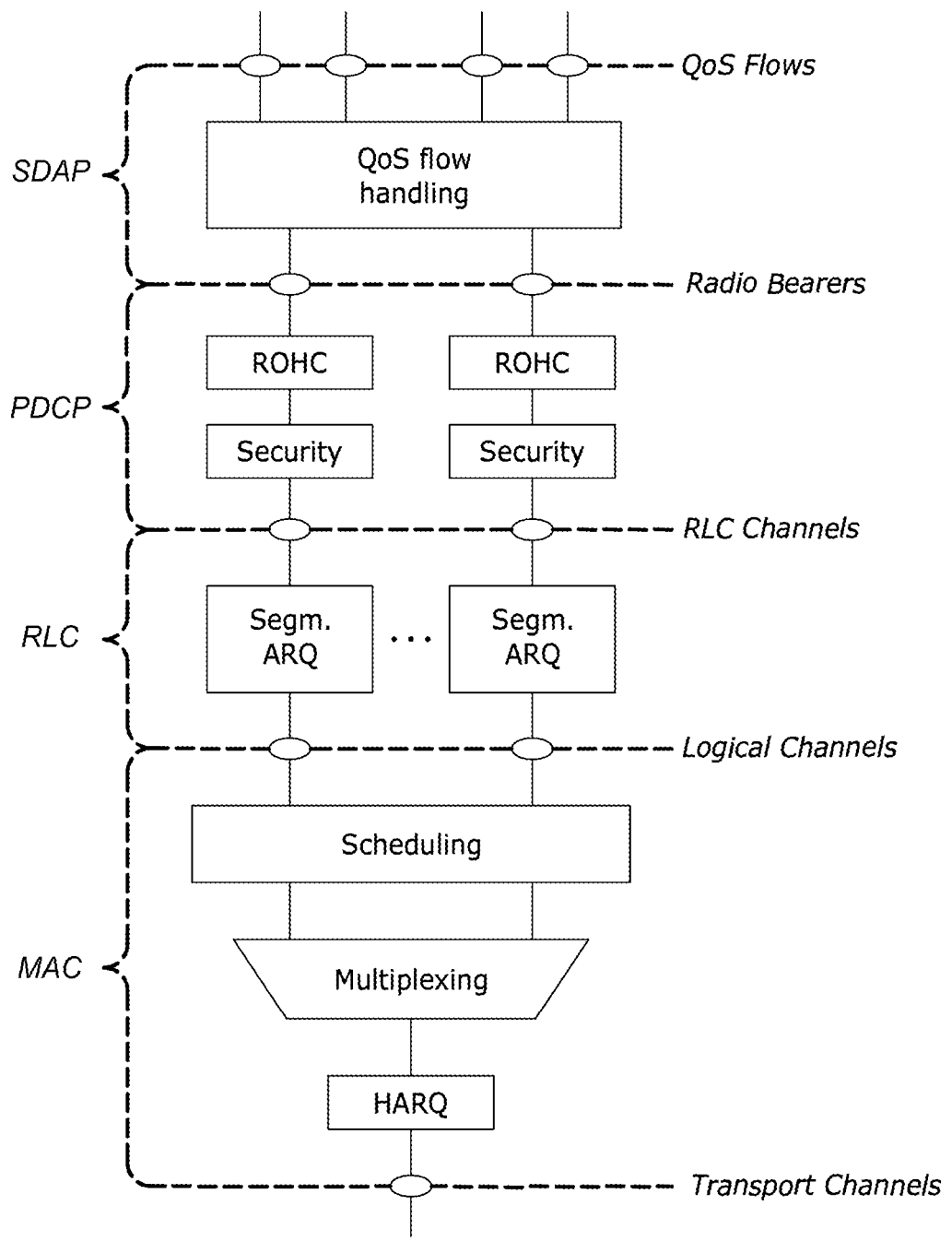
FIG. 5 is a hierarchical diagram illustrating an RB mapping structure in Layer 2, according to an implementation of the present disclosure.

FIG. 5 is a hierarchical diagram illustrating an RB mapping structure in Layer 2, according to an implementation of the present disclosure. As illustrated in FIG. 5, an RB (e.g., SRB and/or DRB) may be mapped to (or associated with) an RLC channel, and an RLC channel may be mapped to an LCH. In other words, an RB may be mapped to an LCH. For example, an RB may be configured with an LCH identity to indicate that the RB is associated with which LCH.

In addition, each RB may be configured with an LCH priority for the associated LCH that is mapped to the RB. For example, the UE may be configured with a default SRB configuration that indicates an LCH configuration and indicates the LCH identity and the default LCH priority for the LCH of an SRB1, the LCH of an SRB2, and/or the LCH of an SRB3.

In some examples, the LCH identity for the SRB1 may be 1, and the default LCH priority value for the SRB1 may be 1.

In some examples, the LCH identity for the SRB2 may be 2, and the default LCH priority value for the SRB1 may be 3.

In some examples, the LCH identity for the SRB3 may be 3, and the default LCH priority value for the SRB1 may be 1.

Based on the default SRB configuration, the LCH priority of the SRB (e.g., SRB1, SRB2, and/or SRB3) may be higher than the LCH priority of the DRB(s) (e.g., the LCH priority value configured for the SRB(s) may be lower than the LCH priority value configured for the DRB(s)). However, for an SDT procedure, a UP data transmission (e.g., data from DRB(s))) may be more important than a CP data transmission (e.g., data from SRB2, NAS messages, and/or RRC messages that include logged measurement information, positioning measurement report, TAU, ULInformationTransfer, DLInformationTransfer, etc.). Thus, some methods are provided to prioritize the transmission of DRB(s) over SRB(s).

In some implementations, for an SDT, the LCH priority value (e.g., an IE priority in the logicalChannelConfig) of the SRB(s) may be configured with a value higher than the LCH priority value of the DRB(s). In other words, the LCH priority of the DRB(s) may be configured higher than the SRB(s).

The LCH value priority value of the SRB and/or the DRB(s) may be configured in the radio bear configuration and/or the default RB configuration, as previously mentioned.

In some implementations, for an SDT, the UE may apply a specific (default) RB configuration. The specific (default) RB configuration may be different from the default SRB configurations specified in 3GPP TS 38.331 V16.4.1. In the specific (default) RB configuration, the LCH priority value (e.g., an IE priority in the logicalChannelConfig) of the SRB1 may be configured higher than a specific value (e.g., 1). In the specific (default) RB configuration, the LCH priority value (e.g., an IE priority in the logicalChannelConfig) of the SRB2 may be configured higher than a specific value (e.g., 3). In the specific (default) RB configuration, the LCH priority value (e.g., an IE priority in the logicalChannelConfig) of the SRB(s) may be configured higher than the LCH priority value (e.g., an IE priority in the logicalChannelConfig) of the DRB(s).

More specifically, in a case that the UE applies the specific default RB configuration, the UE may not apply the default SRB configurations.

In some implementations, a specific indication may be configured for the LCH of SRB(s) to indicate whether the LCH priority of the SRB(s) is higher or lower than the LCH of DRB(s). In some implementations, the specific indication may be configured for the LCH of DRB(s) to indicate whether the LCH priority of the DRB(s) is higher or lower than the LCH of the SRB(s).

More specifically, the specific indication may be a mapping restriction for an LCH.

More specifically, the specific indication may be configured in the logical channel configuration.

More specifically, the specific indication may be configured in the default RB configuration.

More specifically, the specific indication may be included in RRCResume, RRC Setup, RRCRelease, RRCRelease with SuspendConfig, RRCReestablishment, RRCReconfiguration, or RRCReject, etc.

More specifically, the specific indication may be an RRC configuration, a MAC CE, and/or a DCI.

In some implementations, for an LCP procedure, when the UE performs a new transmission, the UE may prioritize to allocate the UL resources to the LCH(s) of the DRB(s) relative to the LCH(s) of the SRB(s).

More specifically, when the UE performs a new transmission, the UE may allocate resources to the LCH(s) of the DRB(s) first, then if any resources remain, the UE may allocate resources to the LCH(s) of the SRB(s).

More specifically, the NW may configure which LCH(s) of the DRB(s) have higher LCH priority than the LCH priority of the LCH(s) of the SRB(s).

In some implementations, the UE may determine that the LCH priority of the DRB(s) is higher than the LCH priority of the SRB(s).

In some examples, the UE may determine that the LCH priority of the DRB(s) is higher than the LCH priority of the SRB(s) when the UE performs the SDT procedure.

In some examples, the UE may determine that the LCH priority of the DRB(s) is higher than the LCH priority of the SRB(s) when the UE enters/starts the subsequent transmission period of an SDT procedure.

In some examples, the UE may determine that the LCH priority of the DRB(s) is higher than the LCH priority of the SRB(s) when the UE determines that a contention resolution of an RA procedure (for an SDT) is successful.

In some examples, the UE may determine that the LCH priority of the DRB(s) is higher than the LCH priority of the SRB(s) when the UE determines that an RA procedure (for an SDT) is successfully completed.

In some examples, the UE may determine that the LCH priority of the DRB(s) is higher than the LCH priority of the SRB(s) when/after the UE transmits a UL message.

The UL message may be transmitted via MSG1/MSG3/MSGA/CG resource/UL resource scheduled by MSG2/MSGB/MSG4 (during an SDT procedure) or on the UL resource that is (pre-)configured as part of an SDT configuration.

The UL message may include an RRC resume request message (e.g., RRCResumeRequest, RRCResumeRequest1, and a CCCH message for SDT).

The UL message may include small data (e.g., UL data associated with a specific SRB/DRB/LCH for SDT).

The UL message may include a MAC CE (e.g., BSR MAC CE).

In some implementations, the prioritizedBitRate (PBR) of the LCH(s) of the SRB(s) may not be configured as infinity.

In the present application, an RB may be associated with an LCH. The SRB(s)/DRB(s), the LCH(s), and/or the LCG(s) may be (specifically) configured for an SDT.

For example, the UE may receive a configuration (e.g., via the RRCRelease message) to indicate whether the RB(s), the LCH(s), and/or the LCG(s) can be used for an SDT. Specifically, the RB(s)/LCH(s) configured for an SDT may not be suspended when the UE is in the RRC_INACTIVE state. Specifically, the RB(s)/LCH(s) configured for SDT may be resumed when the UE initiates an SDT procedure.

Random Access (RA) Procedure

Two types of RA procedure may be supported: 4-step RA type with MSG1 and 2-step RA type with MSGA. Both types of RA procedure support contention-based random access (CBRA) and contention-free random access (CFRA).

The UE may select the type of random access at initiation of the random access procedure based on a network configuration:

In some examples, when CFRA resources are not configured, the UE may use an RSRP threshold to select between 2-step RA type and 4-step RA type.

In some examples, when CFRA resources for 4-step RA type are configured, the UE may perform an RA procedure with 4-step RA type.

In some examples, when CFRA resources for 2-step RA type are configured, the UE may perform an RA procedure with 2-step RA type.

The network does not configure CFRA resources for 4-step and 2-step RA types at the same time for a Bandwidth Part (BWP). CFRA with 2-step RA type is only supported for a handover.

MSG1 of the 4-step RA type consists of a preamble on PRACH. After MSG1 transmission, the UE monitors a response from the network within a configured window. For the CFRA, a dedicated preamble for MSG1 transmission is assigned by the network, and when the UE receives a random access response from the network, the UE ends the random access procedure. For the CBRA, when the UE receives the random access response, the UE sends MSG3 using the UL grant scheduled in the response and monitors a contention resolution. If a contention resolution is not successful after MSG3 (re)transmission(s), the UE goes back to MSG1 transmission.

MSGA of the 2-step RA type includes a preamble on PRACH and a payload on PUSCH. After MSGA transmission, the UE monitors a response from the network within a configured window. For the CFRA, a dedicated preamble and PUSCH resource are configured for MSGA transmission and when the UE receives a response from the network, the UE ends the RA procedure. For the CBRA, if a contention resolution is successful when the UE receives the response from the network, the UE ends the RA procedure. When the UE receives a fallback indication in MSGB, the UE performs MSG3 transmission using the UL grant scheduled in the fallback indication and monitors a contention resolution. If a contention resolution is not successful after MSG3 (re)transmission(s), the UE goes back to MSGA transmission.

If the RA procedure with 2-step RA type is not completed after a number of MSGA transmissions, the UE can be configured to switch to CBRA with 4-step RA type.

Configured Grant (CG)

With configured grants, the gNB can allocate uplink resources for the initial HARQ transmissions to UEs. Two types of configured uplink grants are defined:

With Type 1 (e.g., CG type 1), an RRC layer directly provides the configured uplink grant (including the periodicity).

With Type 2 (e.g., CG type 2), an RRC layer defines the periodicity of the configured uplink grant when a PDCCH addressed to CS-RNTI can either signal and activate the configured uplink grant, or deactivate the configured uplink grant (e.g., a PDCCH addressed to CS-RNTI indicates that the uplink grant can be implicitly reused according to the periodicity defined by an RRC layer, until deactivated).

The NW and/or an RRC layer may configure the following parameters when the CG Type 1 is configured to the UE:
  cs-RNTI: CS-RNTI for retransmission;
  periodicity: periodicity of the configured grant Type 1;
  timeDomainOffset: Offset of a resource with respect to SFN=0 in the time domain;

timeDomainAllocation: Allocation of configured uplink grant in the time domain that includes startSymbolAndLength (i.e., the Start and Length Indicator Value (SLIV) in 3GPP TS 38.214);

nrofHARQ-Processes: the number of HARQ processes for a configured grant.

When the UE receives a configuration of a CG Type 1 for a serving cell, the UE (or MAC entity) may:

store the uplink grant provided by an upper layer of the UE as a configured uplink grant (for the indicated serving cell);

initialize or re-initialize the configured uplink grant to start in the symbol according to timeDomainOffset and S (the start symbol index derived from SLIV as specified in 3GPP TS 38.214), and to reoccur with periodicity.

RRC Connection Resume Procedure

The purpose of the RRC connection resume procedure is to resume a suspended RRC connection, including resuming SRB(s) and DRB(s) or perform an RNA update.

The UE initiates the RRC connection resume procedure when an upper layer or AS of the UE requests the resume of a suspended RRC connection when the UE responds to RAN paging or triggers an RNA update in the RRC_INACTIVE state.

The suspension of the RRC connection may be initiated by the network. When the RRC connection is suspended, the UE stores the UE Inactive AS context and any configuration received from the network, and transitions to the RRC_INACTIVE state. The RRC message to suspend the RRC connection may be integrity protected and ciphered.

The resumption of a suspended RRC connection may be initiated by an upper layer of the UE when the UE transitions from the RRC_INACTIVE state to the RRC_CONNECTED state or by an RRC layer to perform an RNA update or by RAN paging from NG-RAN. When the RRC connection is resumed, the network configures the UE according to the RRC connection resume procedure based on the stored UE Inactive AS context and any RRC configuration received from the network. The RRC connection resume procedure re-activates AS security and re-establishes SRB(s) and DRB(s).

In response to a request for resuming the RRC connection, the network may resume the suspended RRC connection and transition/switch the UE to the RRC_CONNECTED state or reject the request for resuming and transition/switch the UE to the RRC_INACTIVE state (with a wait timer), or directly re-suspend the RRC connection and switch the UE to the RRC_INACTIVE state, or directly release the RRC connection and switch the UE to the RRC_IDLE state, or instruct the UE to initiate a NAS level recovery (in this case, the network transmits an RRC setup message to the UE).

The details of the RRC connection resume procedure can be found in 3GPP TS 38.331 V16.4.1.

Figure 6:
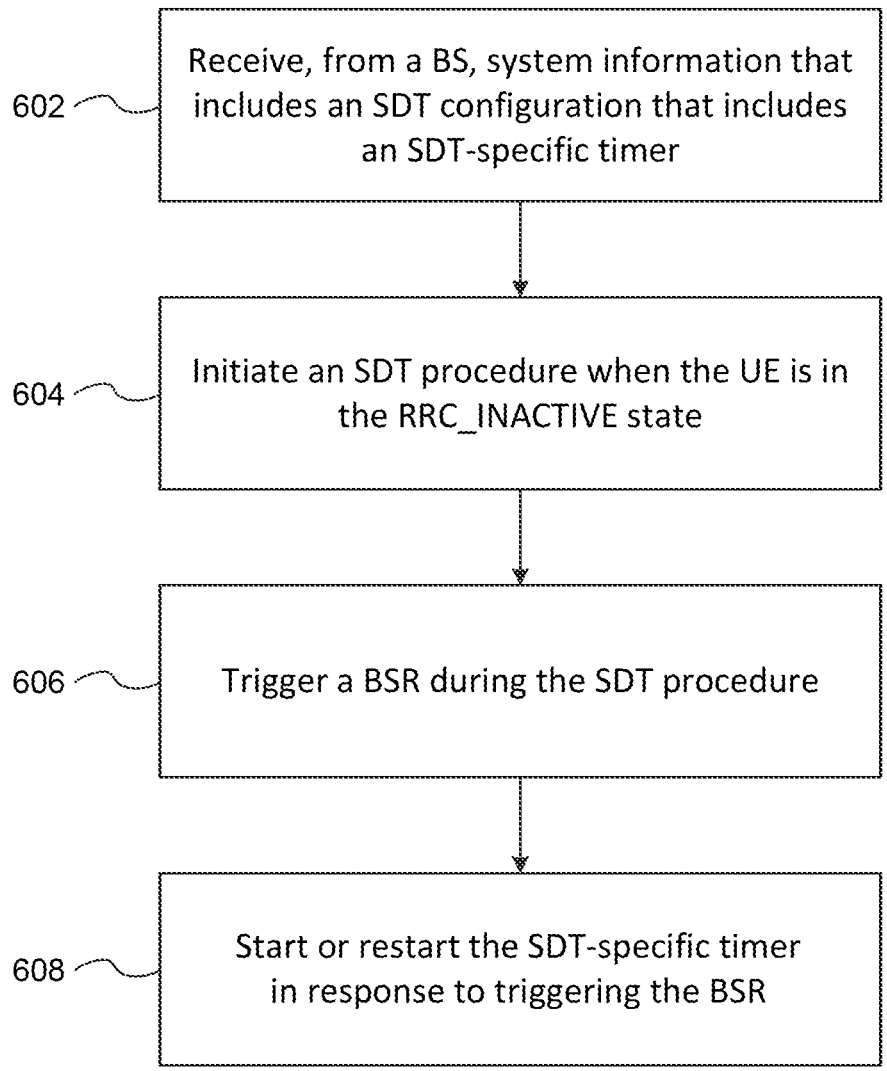
FIG. 6 is a flowchart illustrating a method/process for performing a small data transmission, according to an implementation of the present disclosure.

FIG. 6 is a flowchart illustrating a method/process 600 for an SDT, according to an implementation of the present disclosure. In action 602, the UE receives, from a BS, system information that includes an SDT configuration that includes an SDT-specific timer. In action 604, the UE initiates an SDT procedure when the UE is in the RRC_INACTIVE state. In action 606, the UE triggers a BSR during the SDT procedure. In action 608, the UE starts or restarts the SDT-specific timer in response to triggering the BSR.

In some examples, the UE may determine whether to trigger an SR based on whether the SDT-specific timer is running, after the UE triggers the BSR.

In some examples, the UE may trigger the SR when the SDT-specific timer is not running.

In some examples, the UE may initiate an RA procedure after the UE triggers the SR.

In some examples, the system information includes System Information Block 1 (SIB1).

In some examples, the triggered B SR includes a regular B SR.

In some examples, the UE may receive, from the BS, an indication during the SDT procedure, and may determine whether to trigger an SR, based on the indication, after the UE triggers the BSR.

In some examples, the UE may trigger the SR when the indication is set to a specific value.

In some examples, the UE may initiate an RA procedure after the UE triggers the SR.

In some examples, the indication is included in a logical channel configuration that is received, by the UE, from the BS.

Figure 7:
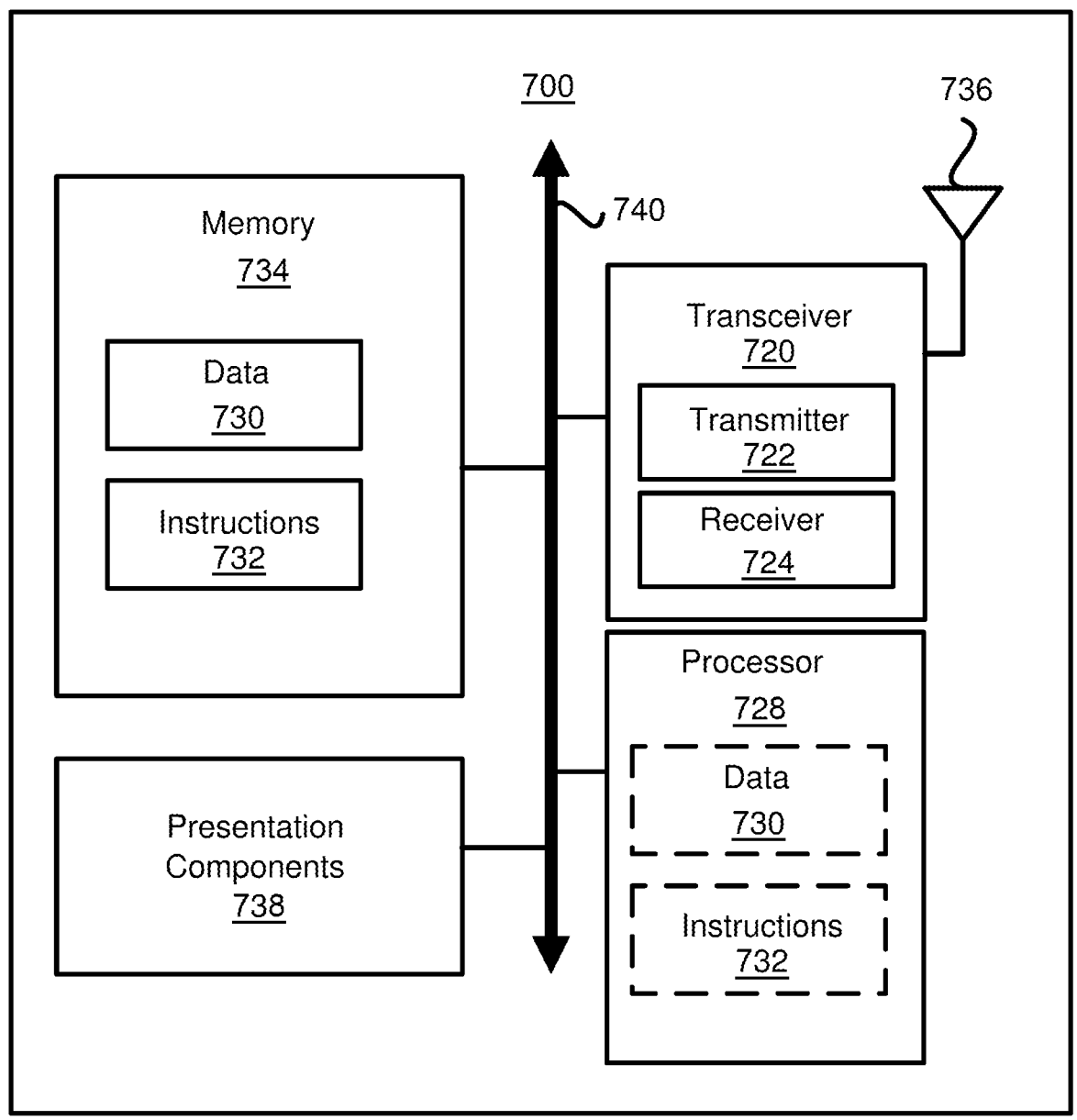
FIG. 7 is a block diagram illustrating a node for wireless communication, according to an implementation of the present disclosure.

FIG. 7 is a block diagram illustrating a node 700 for wireless communication, according to an implementation of the present disclosure.

As illustrated in FIG. 7, the node 700 may include a transceiver 720, a processor 728, a memory 734, one or more presentation components 738, and at least one antenna 736. The node 700 may also include a Radio Frequency (RF) spectrum band module, a BS communications module, a network communications module, a system communications management module, input/output (I/O) ports, I/O components, and a power supply (not illustrated in FIG. 7).

Each of these components may be in communication with each other, directly or indirectly, over one or more buses 740. The node 700 may be a UE or a BS that performs various disclosed functions illustrated in FIG. 6 and examples/implementations in this disclosure.

The transceiver 720 may include a transmitter 722 (with transmitting circuitry) and a receiver 724 (with receiving circuitry) and may be configured to transmit and/or receive time and/or frequency resource partitioning information. The transceiver 720 may be configured to transmit in different types of subframes and slots including, but not limited to, usable, non-usable and flexibly usable subframes and slot formats. The transceiver 720 may be configured to receive data and control channels.

The node 700 may include a variety of computer-readable media. Computer-readable media may be any media that can be accessed by the node 700 and include both volatile (and non-volatile) media and removable (and non-removable) media. Computer-readable media may include computer storage media and communication media. Computer storage media may include both volatile (and/or non-volatile), as well as removable (and/or non-removable), media implemented according to any method or technology for storage of information such as computer-readable media.

Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the disclosed media should be included within the scope of computer-readable media.

The memory 734 may include computer-storage media in the form of volatile and/or non-volatile memory. The memory 734 may be removable, non-removable, or a combination thereof. For example, the memory 734 may include solid-state memory, hard drives, optical-disc drives, etc. As illustrated in FIG. 7, the memory 734 may store computer-readable and/or computer-executable instructions 732 (e.g., software codes) that are configured to, when executed, cause the processor 728 (e.g., processing circuitry) to perform various disclosed functions. Alternatively, the instructions 732 may not be directly executable by the processor 728 but may be configured to cause the node 700 (e.g., when compiled and executed) to perform various disclosed functions.

The processor 728 may include an intelligent hardware device, a central processing unit (CPU), a microcontroller, an ASIC, etc. The processor 728 may include memory. The processor 728 may process the data 730 and the instructions 732 received from the memory 734, and information received through the transceiver 720, the baseband communications module, and/or the network communications module. The processor 728 may also process information sent to the transceiver 720 for transmission via the antenna 736, and/or to the network communications module for transmission to a CN.

One or more presentation components 738 may present data to a person or other devices. Presentation components 738 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method for a user equipment (UE) to perform small data transmission (SDT), the method comprising:
   receiving, from a base station (BS), system information that includes an SDT configuration, the SDT configuration including an SDT-specific timer;
   initiating an SDT procedure when the UE is in a radio resource control (RRC) inactive (RRC_INACTIVE) state;
   triggering a Buffer Status Report (BSR) during the SDT procedure;
   starting or restarting the SDT-specific timer in response to triggering the BSR; and
   determining whether to trigger a scheduling request (SR) based on whether the SDT-specific timer is running after triggering the BSR.

2. The method of claim 1, further comprising:
   triggering the SR when the SDT-specific timer is not running.

3. The method of claim 2, further comprising:
   initiating a random access (RA) procedure after triggering the SR.

4. The method of claim 1, wherein the system information comprises System Information Block 1 (SIB1).

5. The method of claim 1, wherein the BSR comprises a regular BSR.

6. The method of claim 1, further comprising:
   receiving, from the BS, an indication during the SDT procedure; and
   determining whether to trigger the SR further based on the indication after triggering the BSR.

7. The method of claim 6, further comprising:
   triggering the SR when the indication is set to a specific value.

8. The method of claim 7, further comprising:
   initiating a random access (RA) procedure after triggering the SR.

9. The method of claim 6, wherein the indication is included in a logical channel configuration received from the BS.

10. A user equipment (UE) for performing small data transmission (SDT), the UE comprising:
    at least one processor; and
    at least one non-transitory computer-readable medium coupled to the at least one processor and storing computer-executable instructions that, when executed by the at least one processor, cause the UE to:
      receive, from a base station (BS), system information that includes an SDT configuration, the SDT configuration including an SDT-specific timer;
      initiate an SDT procedure when the UE is in a radio resource control (RRC) inactive (RRC_INACTIVE) state;
      trigger a Buffer Status Report (BSR) during the SDT procedure;
      start or restart the SDT-specific timer in response to triggering the BSR; and
      determine whether to trigger a scheduling request (SR) based on whether the SDT-specific timer is running after triggering the BSR.

11. The UE of claim 10, wherein the computer-executable instructions, when executed by the at least one processor, further cause the UE to:
    trigger the SR when the SDT-specific timer is not running.

12. The UE of claim 11, wherein the computer-executable instructions, when executed by the at least one processor, further cause the UE to:
    initiate a random access (RA) procedure after triggering the SR.

13. The UE of claim 10, wherein the system information comprises System Information Block 1 (SIB1).

14. The UE of claim 10, wherein the BSR comprises a regular BSR.

15. The UE of claim 10, wherein the computer-executable instructions, when executed by the at least one processor, further cause the UE to:
    receive, from the BS, an indication during the SDT procedure; and
    determine whether to trigger the SR further based on the indication after triggering the BSR.

16. The UE of claim 15, wherein the computer-executable instructions, when executed by the at least one processor, further cause the UE to:

trigger the SR when the indication is set to a specific value.

17. The UE of claim 16, wherein the computer-executable instructions, when executed by the at least one processor, further cause the UE to:
    initiate a random access (RA) procedure after triggering the SR.

18. The UE of claim 15, wherein the indication is included in a logical channel configuration received from the BS.

\* \* \* \* \*